United States Patent [19]
Takai et al.

[11] Patent Number: 5,150,349
[45] Date of Patent: Sep. 22, 1992

[54] DISC LOADING STRUCTURE

[75] Inventors: Kazuki Takai, Ichikawa; Yuuji Teraguchi; Mitsuo Nakatani, both of Toda, all of Japan

[73] Assignee: Clarion Co., Ltd., Tokyo, Japan

[21] Appl. No.: 599,035

[22] Filed: Oct. 17, 1990

[30] Foreign Application Priority Data

| Oct. 19, 1989 | [JP] | Japan | 1-272646 |
| Oct. 19, 1989 | [JP] | Japan | 1-272648 |
| Oct. 20, 1989 | [JP] | Japan | 1-273446 |
| Oct. 20, 1989 | [JP] | Japan | 1-273447 |

[51] Int. Cl.$^5$ .............. G11B 33/02; G11B 17/04; G11B 17/08; G11B 15/48
[52] U.S. Cl. .................. 369/75.2; 369/187; 360/74.5; 360/99.06
[58] Field of Search .......... 369/77.1, 77.2, 75.1, 369/75.2; 360/99.02, 99.04, 99.06

[56] References Cited

U.S. PATENT DOCUMENTS

| 4,674,080 | 6/1987 | Higuchi et al. | 369/77.2 |
| 4,695,995 | 9/1987 | Koizumi | 369/75.2 |
| 4,797,869 | 1/1989 | Hirano | 369/75.2 |
| 5,031,169 | 7/1991 | Kato et al. | 369/77.1 |
| 5,038,337 | 8/1991 | Muramatsu et al. | 369/75.2 X |

*Primary Examiner*—John W. Shepperd
*Assistant Examiner*—Michael Kessell
*Attorney, Agent, or Firm*—Price, Gess & Ubell

[57] ABSTRACT

A disc loading structure capable of safely and effectively carrying out a disc loading operation free from mistake. The disc loading structure includes a sensor group consisting of a plurality of disc detecting sensors each selectively exhibiting a detection mode and non-detection mode. The sensor group is arranged so as to permit the disc loading structure to properly accomplish the disc loading operation such as detection and ejection of any foreign article inserted therein, discrimination and loading of each of discs different in size and the like, depending upon a pattern of combination of the detection and/or non-detection modes of the sensors.

6 Claims, 18 Drawing Sheets

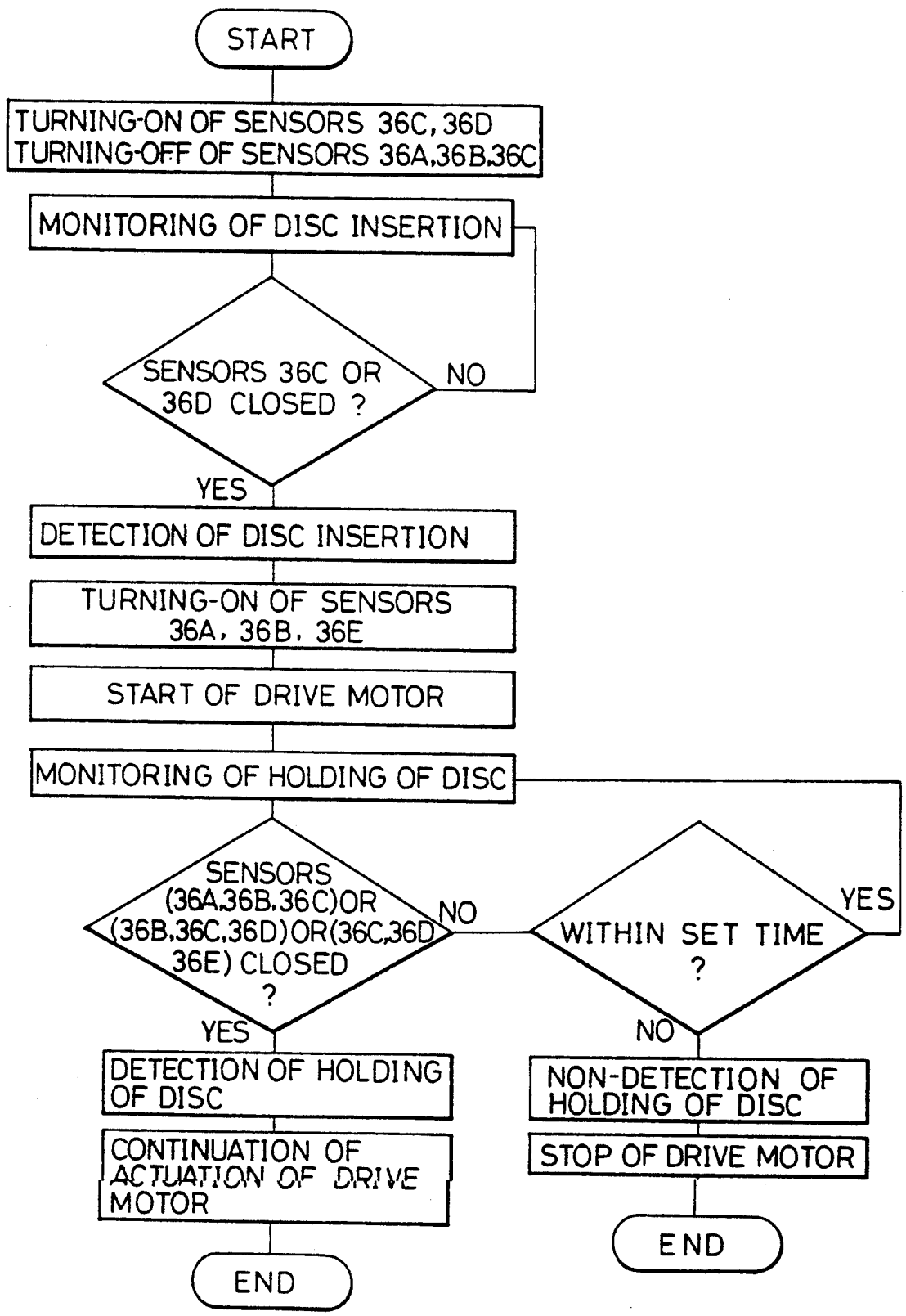

DISC LOADING STRUCTURE

BACKGROUND OF THE INVENTION

1. Field of the Invention

This invention relates to a disc loading structure, and more particularly to a disc loading structure which is adapted to properly accomplish an operation of loading a disc in a disc player such as a compact disc player, a laser disc player or the like.

2. Description of Related Art

Conventionally, a compact disc player for reproducing a digital signal recorded on a compact disc is provided with a disc loading structure for loading the player with the compact disc while holding it. For this purpose, a disc loading structure of the automatic loading type which is constructed as shown in FIGS. 1 and 2 is conventionally employed.

More particularly, the conventional disc loading structure includes a housing 20 and a turntable 22 rotatably arranged in the housing 20. The housing 20 is provided on the front side thereof with a disc port 24. Also, the disc loading structure includes a transfer roller 26 which is arranged so as to be rotatable in both directions and positioned between the turntable 22 and the disc port 24. When a disc 28 is to be loaded in a disc player, the disc 28 which is inserted through the disc port 24, as shown in FIG. 2, is vertically interposed between the transfer roller 26 and a support member 30 arranged vertically opposite to the transfer roller 26 in the housing 20. Then, the transfer roller 26 is rotated in one direction or a disc loading direction to transfer the disc 28 to a position above the turntable 22. In order to ensure that the disc 28 is accurately positioned above the turntable 22, a pair of positioning guide pins 32 are arranged at the rear section of a disc transfer passage defined in the housing 20. Such arrangement of the positioning pins 32 permits the peripheral edge of the disc 28 to be abutted against the pins 32 during the loading operation, to thereby align a central hole 34 of the disc 28 with the turntable 22. Then, the disc 28 is lowered onto the turntable 22 through a suitable, lifting means (not shown) such as a liftable clamping or chucking means. Then, the completion of operation of the chucking means is detected through a microswitch or the like, so that a drive motor (not shown) is stopped to stop the actuation of the transfer roller 26, resulting in the loading operation being completed.

As will be noted from the foregoing, in the conventional disc loading structure of the automatic loading type constructed as described above, the placing of the disc on the turntable for play-back merely requires the insertion of the disc through the disc port 24 into the structure. Thus, the disc loading structure exhibits excellent operability even under vibrating conditions, resulting in being used for a mounted-type disc player which is adapted to be mounted on a vehicle such as a car or the like.

However, the conventional disc loading structure fails to generate an ejection signal when a foreign article of a size smaller than a predetermined disc such as a credit card or the like is inserted through the disc port thereinto, so that it irreversibly enters the disc loading structure. This causes an internal mechanism of the disc player such as a pickup, a spindle or the like to be often damaged or failed. Thus, the conventional disc loading structure fails to distinguish a disc from a foreign article, leading to a failure in operation with reliability.

Recently, the demand on a compact disc by consumers is highly diversified with the rapid spread of the compact disc, leading to the manufacturing of a compact disc of a diameter as small as 8 cm (8 cm compact disc) which is called a single CD, in addition to an existing compact disc of 12 cm in diameter (12 cm compact disc). The 8 cm disc corresponds to an analog single disc of 17 cm in diameter. The appearance of the 8 cm disc causes some important problems. The conventional compact disc player is constructed so as to accommodate to only the existing 12 cm compact disc, to thereby fail to distinguish the 8 cm disc and 12 cm disc from each other. Therefore, the playing-back of the 8 cm compact disc requires to use an exclusive adapter therefor. Thus, when only the adapter for the 8 cm compact disc is erroneously inserted through the disc port, the disc loading structure causes it to irreversibly enter the structure while failing to generate an ejection signal, leading to a failure in the internal mechanism of the disc player. Thus, it will be noted that the conventional disc loading structure also fails to distinguish the compact disc from the adapter.

Further, the use of the exclusive adapter for the 8 cm disc renders the disc loading operation highly troublesome. In order to eliminate the problem, it is proposed that the disc loading structure is provided with a stopper arm for positioning a compact disc in place and holding it on a turntable. However, the conventional disc loading structure also fails to accurately discriminate discs of different sizes from each other during the disc loading operation.

In addition, it is proposed that the conventional disc loading structure is provided with a single sensor for detecting the completion of insertion of the disc 28. For this purpose, it is arranged between the disc port 24 and the transfer roller 26. Such a single sensor may comprise, for example, a photosensor arranged so as to be positioned slightly outside the outer periphery of the disc 28 when it is placed on the turntable 22. The single sensor is adapted to exhibit a detection mode when it detects that something obstructs it and exhibit a non-detection mode when there is nothing to obstruct it. Thus, when the sensor takes the detection mode and then exhibits the non-detection mode, the structure judges that the disc is placed on the turntable 22, to thereby detect the completion of insertion of the disc and start the chucking means, resulting in completing the loading. Unfortunately, such arrangement of the single sensor causes some disadvantages. More specifically, when there occurs any accident such as the insertion of a foreign article other than the compact disc into the structure, the lateral movement of the disc near the disc port, the drawing-out of the disc from the structure after slight insertion of the disc through the disc port thereinto, or the like which is sufficient to cause actuation of the sensor, the mode of the detection sensor is changed from the detection mode to the non-detection mode, to thereby cause the clamping or chucking means to uselessly carry out or repeat the disc clamping or chucking operation, resulting in the disc, the components of the structure and the like being damaged and-/or failed.

It is widely known in the art that the above-described disadvantages are also encountered with various disc players in addition to the compact disc player.

SUMMARY OF THE INVENTION

The present invention has been made in view of the foregoing disadvantages of the prior art.

Accordingly, it is an object of the present invention to provide a disc loading structure which is capable of properly carrying out a disc loading operation using a combination of a plurality of disc detecting sensors.

It is another object of the present invention to provide a disc loading structure which is capable of positively discriminating a foreign article from a predetermined disc.

It is a further object of the present invention to provide a disc loading structure which is capable of effectively preventing the loading of only an adapter for a disc.

It is still another object of the present invention to provide a disc loading structure which is capable of accurately discriminating discs different in size from each other to safely handle them with high reliability.

It is a still another object of the present invention to provide a disc loading structure which is capable of effectively preventing a disc and the structure from being damaged and/or failed due to a failure in insertion of the disc thereinto.

It is an even further object of the present invention to provide a disc loading structure which is capable of eliminating useless operation of the structure.

In accordance with the present invention, a disc loading structure is provided. The disc loading structure includes a sensor group comprising a plurality of disc detecting sensors each selectively exhibiting a detection mode and a non-detection mode. The sensor group is arranged so as to permit the disc loading structure to properly carry out a disc loading operation due to a combination of the detection and/or non-detection modes.

Also, in accordance with the present invention, there is provided a disc loading structure which comprises a transfer means for transferring a disc to a turntable and a sensor group comprising a plurality of disc detecting sensors each selectively exhibiting a detection mode and a non-detection mode. The disc detecting sensors each are arranged forward of the transfer means so as to selectively generate a loading signal or an ejection signal depending upon the detection mode and non-detection mode.

The sensor group continues to generate a loading signal while at least one of the disc detecting sensors exhibits the detection mode and generates the ejection signal while all the disc detecting sensors exhibit the non-detection mode during the generation of the loading signal.

In accordance with the present invention, there is also provided a disc loading structure comprising a transfer means for transferring a disc to a position above a turntable and a sensor group comprising a plurality of disc detecting sensors selectively exhibiting a detection mode and a non-detection mode. The sensor group is divided into a first sensor group section and a second sensor group section, wherein the first sensor group section is arranged so as to define therein an interval smaller than the diameter of a large disc and the second sensor group is interposedly arranged in the first sensor group section and arranged so as to define therein an interval smaller than the diameter of a small disc. The sensor group judges that an article inserted is an adapter for dimensionally adapting the small disc to the large disc, when the first sensor group section exhibits the detection mode and the second sensor group section exhibits the non-detection mode.

Furthermore, in accordance with the present invention, there is provided a disc loading structure comprising a plurality of disc detecting sensors each selectively exhibiting a detection mode and a non-detection mode, a transfer means for transferring a disc to a turntable, a drive means for driving the transfer means, and a drive control means for judging insertion of the disc into the structure and holding of the disc by the transfer means to control actuation of the drive means. The drive control means, depending upon a pattern of combination of the detection and/or non-detection modes which the sensors exhibit during the disc loading operation, detects whether the disc has been inserted through a disc port of the structure and actuates the drive means when the insertion is detected. Also, the drive control means, depending upon a pattern of combination of the detection and/or non-detection modes which the sensors exhibit within a predetermined set time from the detection of insertion of the disc, detects whether the disc has been inserted to a holding position at which the holding of the disc by the transfer means is carried out, and continues the actuation of the drive means when the insertion of the disc to the holding position is detected and stops the actuation of the drive means when the holding is not deleted.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference characters designate like or corresponding parts throughout; wherein:

FIG. 19 is a flow chart showing the manner of operation of the disc loading structure shown in FIG. 18.

DETAILED DESCRIPTION OF THE PREFERRED EMBODIMENTS

Now, a disc loading structure according to the present invention will be described hereinafter with reference to FIGS. 3 to 19.

FIGS. 3 to 6 illustrate an embodiment of a disc loading structure according to the present invention. As described above, the present invention employs a sensor group consisting of a plurality of disc detecting sensors each selectively exhibiting a detection mode and a non-detection mode, resulting in being properly actuated due to a pattern of combination of the detection and/or non-detection modes of the sensors. A disc loading structure shown in FIGS. 3 to 6 is constructed so as to effectively ensure its safe operation by positively excluding an article foreign from a predetermined disc.

Figure 1:
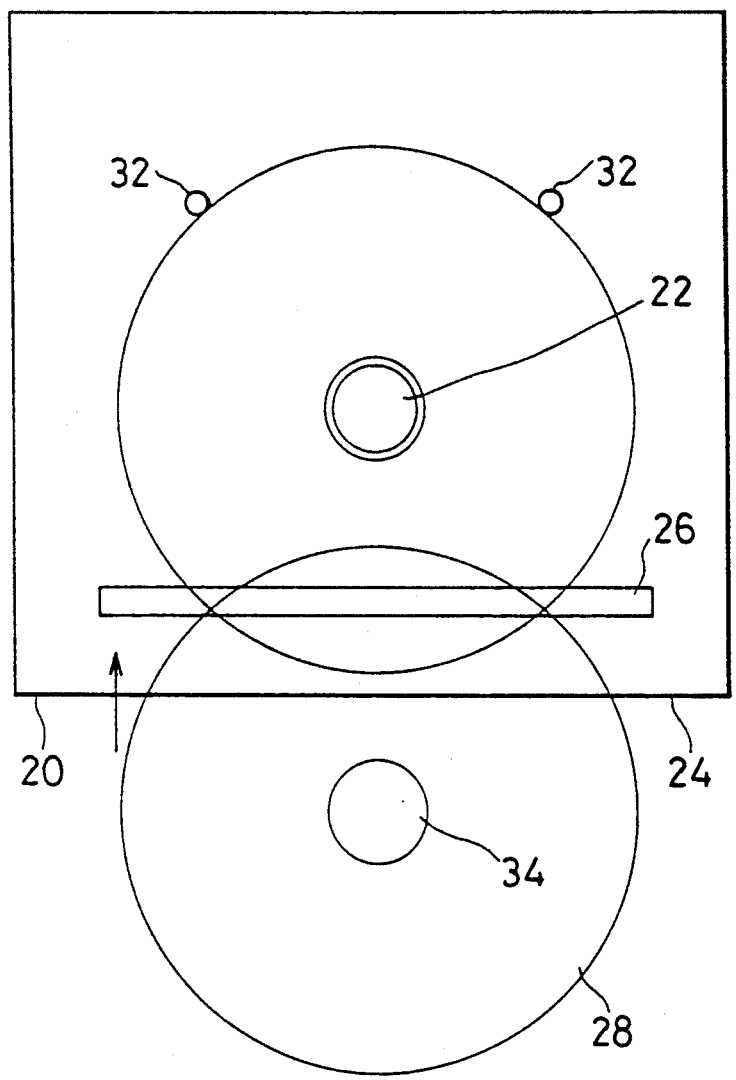
FIG. 1 is a schematic plan view schematically showing a conventional disc loading structure.
Figure 2:
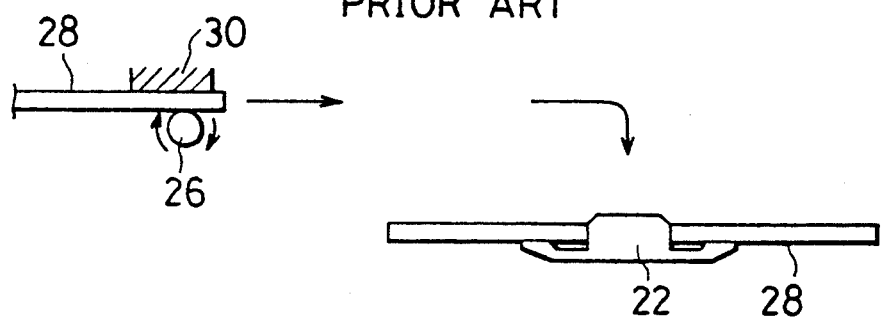
FIG. 2 is a fragmentary schematic side elevation view partly in section of the disc loading structure shown in FIG. 1.
Figure 3:
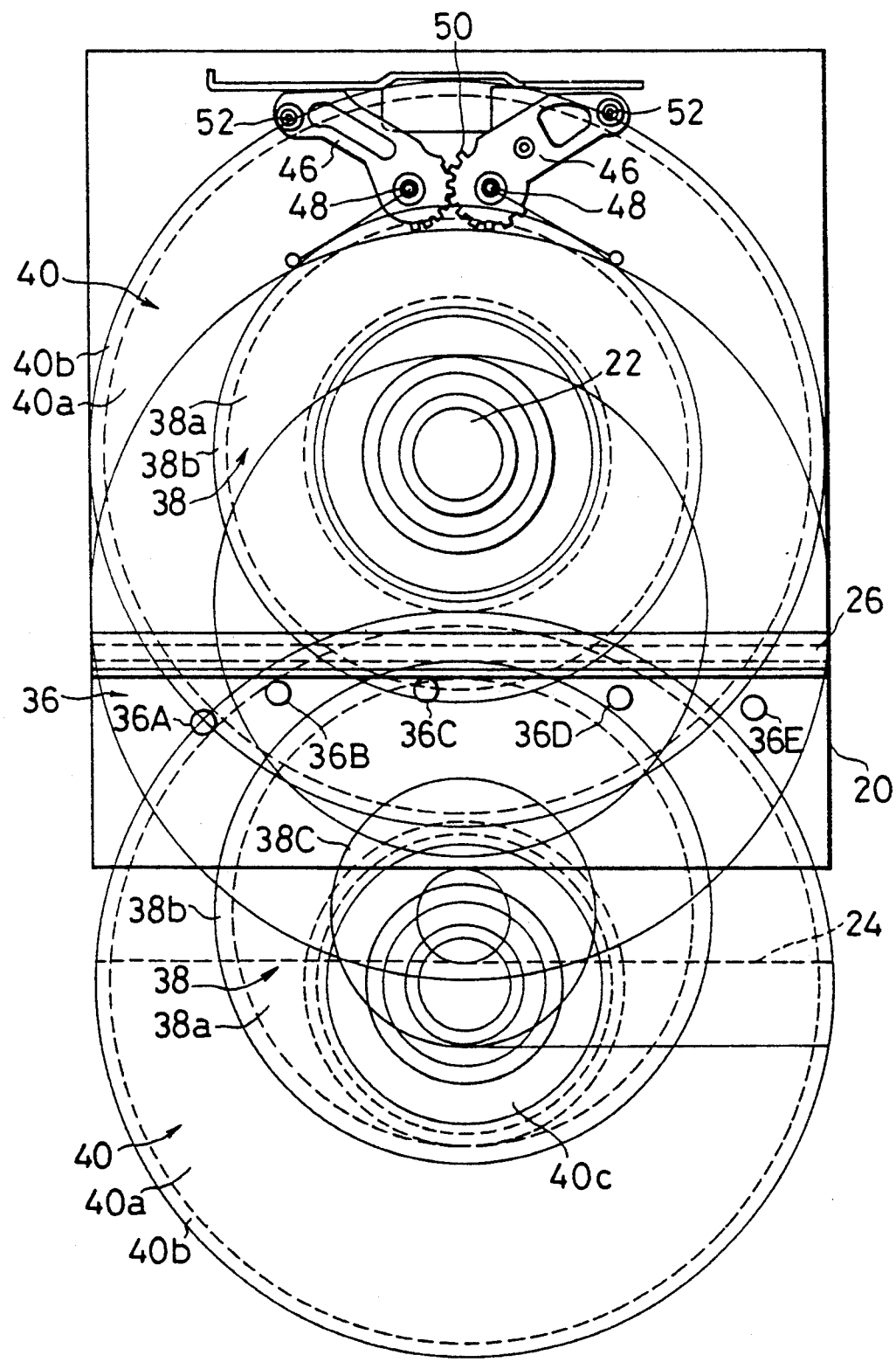
FIG. 3 is a plan view showing an embodiment of a disc loading structure according to the present invention.

The disc loading structure of the illustrated embodiment, as shown in FIG. 3, includes a housing 20, a transfer roller 26 arranged in the housing 20 and a sensor group 36 consisting of a plurality of disc detecting sensors arranged in a disc transfer passage defined between a disc port 24 and a position predetermined rearward of the transfer roller 26 in the housing 20. In the embodiment, the sensor group 36 comprises five disc detecting sensors 36A to 36E which are arranged on the side of the transfer roller 26 facing the disc loading port 24 in a manner to be in proximity to the transfer roller and substantially in a row in the lateral direction of the housing 20. More particularly, the sensor group 36 includes a first end sensor 36A and a second end sensor 36E constituting both ends of the sensor group, a central sensor 36C constituting the center of the group, a first intermediate sensor 36B positioned between the first end sensor 36A and the central sensor 36C, and a second intermediate sensor 36D positioned between the second end sensor 36E and the central sensor 36C. The first and second end sensors 36A and 36E can constitute a first sensor group and are so arranged that a distance therebetween in the lateral direction of the housing 20 is defined so as to be somewhat larger than 8 cm or the diameter of an 8 cm disc 38. The second end sensor 36E is positioned so as to be spaced from a vertical line extending through the center of a turntable 22 by a distance larger than the distance between the first end sensor 36A and the vertical line, to thereby prevent the outer periphery of a 12 cm disc 40 from substantially reaching the second end sensor 36E when it is placed on the turntable 22. In the illustrated embodiment, the second end sensor 36E is arranged apart from the outermost periphery of the 12 cm disc 40. The first and second intermediate sensors 36B and 36D can constitute a second sensor group and are arranged so that a lateral distance therebetween is defined so as to be smaller than 8 cm. Also, the central sensor 36C is positioned inside the outer periphery of the 8 cm disc 38 when it is placed on the turntable 22.

Figure 4:
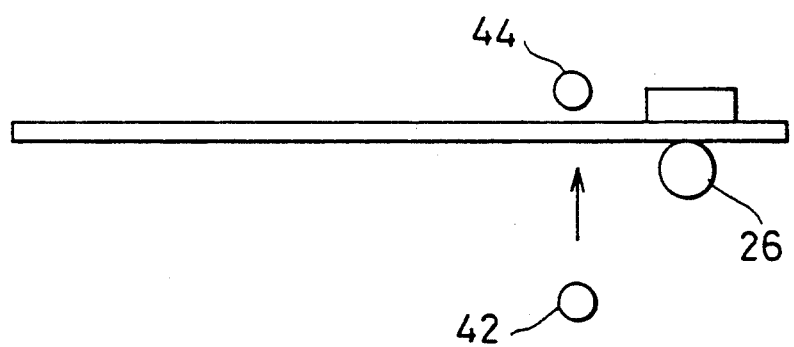
FIG. 4 is a schematic fragmentary side elevation view showing an essential part of the disc loading structure shown in FIG. 3.

The disc detecting sensors 36A to 36E, as shown in FIG. 4, each comprise a light emitting diode (LED) 42 and a light receptor 44 which are so arranged that light emitted from the diode 42 is received by the receptor 44 when no light-interceptor is interposed therebetween. The sensor detects the state as an open state, resulting in the sensor exhibiting or taking a non-detection mode. Whereas, when any light-interceptor is between the diode 42 and the light receptor 44, light from the diode 42 fails to reach the receptor. The sensor detects this state as a closed state, so that it exhibits a detection mode. More specifically, when each of the sensors 36A to 36E overlaps the deposited section 38a of the 8 cm disc 38 or the deposited section 40a of the 12 cm disc 40, the sensor is closed to exhibit the detection mode; whereas when the sensors each do not overlap the deposited section of each of the discs or overlap only the outer peripheral section 38b or 40b of each disc 38 or 40 outside the deposited section of the disc or the light-permeable inner peripheral section 38c or 40c of the disc 38 or 40, the sensor is open to exhibit the non-detection mode.

Also, the disc loading structure is adapted to utilize a pattern of combination of the detection and/or non-detection modes of the sensor group to output a loading/ejection signal through the sensor group to a microcomputer acting as a loading control means, so that the microcomputer selectively supplies a loading or ejection command to a loading motor, resulting in the transfer roller 26 being rotated in any desired direction for loading or ejection.

Rearward of the turntable 22 in the housing 20 are arranged a pair of stopper arms 46 in a manner to be symmetrically pivotally moved about support shafts 48. The stopper arms 46 are connected to each other through gears 50 provided on the portions of the proximal ends thereof facing each other. Also, the stopper arms 46 each are provided at the distal end thereof with a stopper pin 52 against which the outer periphery of the compact disc inserted into the structure is abutted. The stopper arms 46 each may be located at a place at which the compact disc is held with respect to the turntable 22, through a position regulating plate (not shown) actuated due to the actuation of a solenoid (not shown).

Also, the disc loading structure of the illustrated embodiment may be constructed so that a chucking or clamping means or plate (not shown) is started upon the completion of insertion of the disc into the structure and a microswitch detects a position at which the actuation of the chucking plate is completed, resulting in completing the disc loading operation followed by playing-back of the disc.

The remaining part of the illustrated embodiment may be constructed in substantially the same manner as the prior art.

Now, the manner of operation of the disc loading structure of the illustrated embodiment will be described hereinafter.

(1) Start of Loading

When at least one of the central sensor 36C and intermediate sensor 36D detects the insertion of any article through the disc port 24 to exhibit the detection mode after the structure is electrically turned on, a loading signal is supplied from the sensor to the microcomputer, which then supplies a loading command to the loading motor, so that the transfer roller 26 may be actuated to draw the article into the structure.

It would be considered that the inserted article is left as inserted without reaching the transfer roller 26 after the central sensor 36C or intermediate sensor 36D exhibits the detection mode. In view of such a situation, if the remaining sensors do not exhibit the detection mode although a predetermined length of time elapses, it is judged that a failure in insertion is due to catching by an article of a shape foreign from a predetermined shape, so that the sensor group stops generating the loading signal. This causes the supply of the loading command from the microcomputer to the loading motor to be stopped, resulting in the transfer roller 26 being stopped.

When all the sensors exhibit the non-detection mode in the above-described situation, it is judged that the article which is left as inserted is removed, resulting in the structure being ready for the next disc loading operation.

(2) Confirmation of Engagement Between Transfer Roller and Compact Disc

When a combination of three sensors 36A, 36B and 36C; 36B, 36C and 36D; or 36C, 36D and 36E exhibits the detection mode subsequent to the start of the loading, the generation of the loading signal is continued.

However, when any combination of the sensors other than the above-described sensor combination assumes the detection mode or a predetermined period of time (for example, 5 seconds) elapses, it is judged the article inserted is a foreign article other than the compact disc, so that the sensor group stops the supply of the loading signal. This causes the loading command to be stopped from the microcomputer to the loading motor, so that the transfer roller 26 is stopped.

(3) Continuation of Insertion of Compact Disc

When at least one of the sensors exhibits the detection mode after the engagement between the transfer roller 26 and the disc is confirmed, it is judged that the article inserted is a compact disc, so that the generation of the loading signal is continued. This causes the microcomputer to continue the supply of the loading command to the loading motor, resulting in the transfer roller 26 continuing the rotation to draw the disc into the structure.

(4) Removal of Foreign Article

However, when all the disc detecting sensors 36A to 36E concurrently exhibit the non-detection mode during the disc loading operation, the sensor group judges that the article inserted is a foreign article. This causes the microcomputer to output an ejection command to the loading motor to rotate the transfer roller 26 in the opposite direction, resulting in the article being ejected.

(5) Completion of Insertion of Compact Disc

When it is detected that the compact disc that is inserted is abutted against the stopper pins 52 regulated to the 8 cm disc position while the disc loading operation is advanced and only the central sensor 36C takes the detection mode and after a predetermined period of time elapses, it is judged that the insertion of the 8 cm disc is completed. Whereas, when it is detected that the compact disc is abutted against the stopper pins 52 held at the 12 cm disc position while only the first end sensor 36A takes the non-detection mode and after a predetermined period of time elapses, it is judged that the insertion of the 12 cm disc is completed.

When the insertion of the compact disc is thus completed, the chucking plate is started and the position at which the operation of the chucking plate is completed is detected by the microswitch, so that the disc loading operation is completed.

The embodiment described above may be so constructed that a pattern of combination of the detection and/or non-detection modes of the sensors 36A to 36E is utilized to carry out the changing-over between constraint by the solenoid and release from the solenoid. This permits the stopper pin 52 of each of the stopper arms 46 to be selectively located at the 8 cm disc position or 12 cm disc position through the position regulating plate operatively associated with the solenoid, resulting in two kinds of compact discs different in standards being discriminated from each other through an electrical detection means.

Figure 5:
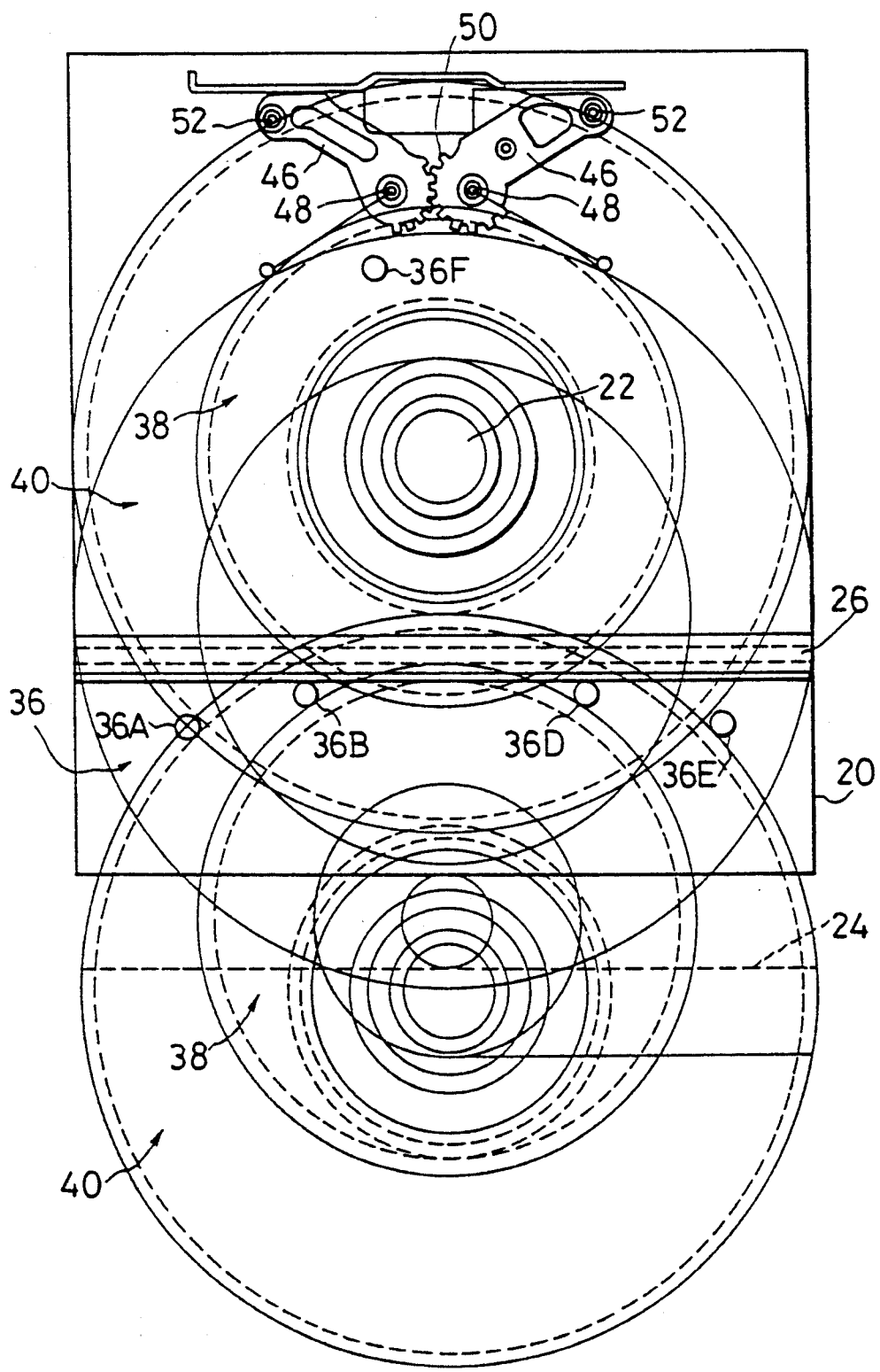
FIG. 5 is a plan view showing a modification of the disc loading structure shown in FIG. 3.

FIG. 5 shows a modification of the disc loading structure described above with reference to FIG. 3. A disc loading structure of the modification includes a sensor group comprising a first end sensor 36A, a second end sensor 36E, a first intermediate sensor 36B and a second intermediate sensor 36D arranged on the side of a transfer roller 26 facing a disc port 24 in a housing 24 and a rear sensor 36F arranged rearward of the transfer roller 26 in the housing 24 for detecting the completion of insertion of an 8 cm compact disc 38 into the structure.

The first and second end sensors 36A and 36E are arranged so that a lateral distance therebetween is defined to be 12 cm or less and also the first end sensor 36A is positioned so as to exhibit the non-detection mode when the insertion of a 12 cm disc 40 is completed. The first and second intermediate sensors 36B and 36D are arranged in proximity to the transfer roller 26 and so as to cause a lateral distance therebetween to be defined to be 8 cm or less. Also, the sensors 36B and 36D each are located at a position which permits it to exhibit the non-detection mode when the insertion of the 8 cm disc 38 is completed.

The rear sensor 36F is arranged inside the outer periphery of the 8 cm disc 38 when it is set on a turntable 22, so that it may detect the completion of insertion of the 8 cm disc 38 when it exhibits a detection mode. In the modification, the sensor 36F is positioned rearward of the turntable 22.

In the modification, five sensors 36A to 36E in place of the four sensors may be arranged in the same manner as in the embodiment of FIG. 3 on the side of the transfer roller facing the disc port.

The remaining part of the modification may be constructed in substantially the same manner as the embodiment shown in FIG. 3.

Now, the manner of operation of the modification shown in FIG. 5 will be described hereinafter.

When the two intermediate sensors 36B and 36D concurrently take the detection mode, a loading command is supplied to the transfer roller 26, to thereby cause it to draw an inserted article into the structure. At this time, when at least one of the four sensors 36A to 36E exhibits the detection mode, the generation of the loading command is continued. Further, if all the sensors 36A to 36E take the non-detection mode when the rear sensor 36F takes the detection mode, it is judged that the inserted article is the 8 cm disc, resulting in the insertion being completed. Whereas, when the sensors 36B, 36D and 36E each take the detection mode and the sensor 36A exhibits the non-detection mode although the rear sensor 36F exhibits the detection mode, it is judged that the inserted article is the 12 cm disc, so that the insertion is completed.

However, when all the sensors 36A to 36E take the detection mode before the rear sensor 36F exhibits the detection mode, it is judged that the inserted article is an article foreign from the compact disc, so that an ejection command is generated instead of the loading command to reverse the transfer roller 26, resulting in the foreign article being ejected.

As can be seen from the foregoing, the modification of FIG. 5 permits the completion of the loading to be detected without detecting the abutment of the disc against the stopper pins 52 after a pattern of combination of the detection and/or non-detection modes of the sensors elapses for a predetermined period of time as in the above-described embodiment, resulting in reducing time required for discriminating the compact disc and rapidly removing any foreign article.

Figure 6:
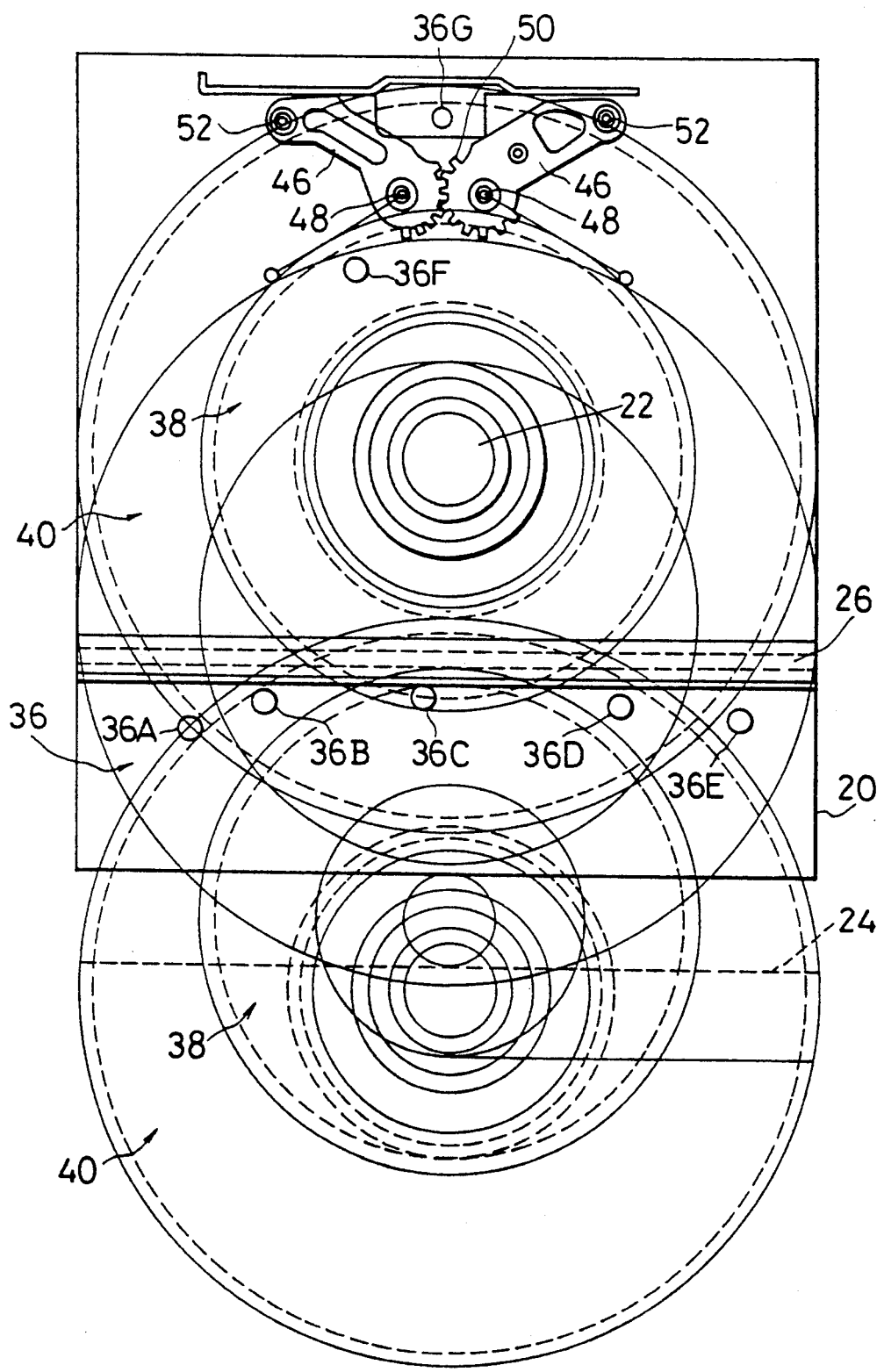
FIG. 6 is a plan view showing another modification of the disc loading structure shown in FIG. 3.

Referring now to FIG. 6 showing another modification of the embodiment shown in FIG. 3, a rearmost sensor 36G is provided in addition to five sensors 36A to 36E and a rear sensor 36F. The sensors 36A to 36E may be located in the same manner as in the embodiment of FIG. 3 and the rear sensor 36F may be arranged in the same manner as in the modification of FIG. 5. The rearmost sensor 36G is arranged at the rearmost position in a housing 20 for detecting the completion of insertion of a 12 cm disc.

Such construction of the modification permits the completion of insertion of a 12 cm disc 40 to be more positively judged, to thereby reduce time required to discriminate any foreign article and accomplish the detection with high accuracy.

As can be seen from the foregoing, the embodiment shown in FIGS. 3 to 6 is so constructed that a plurality of the disc detecting sensors each selectively exhibiting the detection mode and non-detection mode. Such simple construction of the embodiment permits any foreign article inserted into the structure to be readily removed therefrom without being clamped therein.

FIGS. 7 to 10 show another embodiment of a disc loading structure according to the present invention, which is so constructed that only an adapter for an 8 cm disc which is inserted thereinto is safely removed therefrom without being clamped therein, to thereby effectively protect internal mechanisms of the structure and a disc player.

For this purpose, the disc loading structure of the illustrated embodiment includes a sensor groups 36 comprising five disc detecting sensors arranged on the side of a transfer roller 26 facing a disc port 24. More particularly, the sensor group 36 includes a first end sensor 36A and a second end sensor 36E constituting both ends of the sensor group, a central sensor 36C constituting the center of the group, a first intermediate sensor 36B positioned between the first end sensor 36A and the central sensor 36C, and a second intermediate sensor 36D positioned between the second end sensor 36E and the central sensor 36C. The first and second end sensors 36A and 36E are so arranged that a distance therebetween in the lateral direction of a housing 20 is defined so as to be somewhat larger than 8 cm or the diameter of an 8 cm disc 38. The first end sensor 36A is positioned so as to be spaced from a vertical line extending through the center of a turntable 22 by a distance larger than the distance between the second end sensor 36E and the vertical line, to thereby prevent the outer periphery of a 12 cm disc 40 from substantially reaching the first end sensor 36A when it is placed on the turntable 22. In the illustrated embodiment, the first end sensor 36A is arranged so as to overlap the outermost periphery of the 12 cm disc 40 which is defined outside the deposited section of the disc.

The sensor group comprising the disc loading sensors 36A to 36E selectively generates an 8 cm disc mode command or a 12 cm disc mode command depending upon a pattern of combination of detection and non-detection modes of the sensors, so that restraint by a solenoid (not shown) may be carried out or released. Also, the sensor group selectively supplies a loading command or an ejection command to a loading motor to rotate the transfer roller 26 in any one of both directions.

The solenoid is connected to stopper arms 46 through a pivotable position regulating plate (not shown). When an article inserted is the 8 cm disc 38, the solenoid holds the stopper arms 46 by suction; whereas when the article is the 12 cm disc 40, the stopper arms 46 are released from the solenoid, resulting in the transfer roller 26 transferring the 12 cm disc to a 12 cm disc position.

The remaining part of the illustrated embodiment may be constructed in substantially the same manner as the embodiment of FIG. 3.

Now, the manner of operation of the embodiment constructed as described above will be described hereinafter with reference to FIGS. 7 to 10.

(1) Start of Loading

When at least one of the central sensor 36C and second intermediate sensor 36D detects the insertion of any article through the disc port 24 to exhibit the detection mode after the structure is electrically turned on, a loading command is output from the sensor, so that the transfer roller 26 may be actuated to draw the article into the structure. Concurrently, an 8 cm disc mode command is supplied to the solenoid to cause it to carry out a suction operation. This leads to pivotal movement of the position regulating plate, resulting in the stopper arms 46 being regulated to the 8 cm disc position.

(2) Judgment of 12 cm Disc

Figure 8:
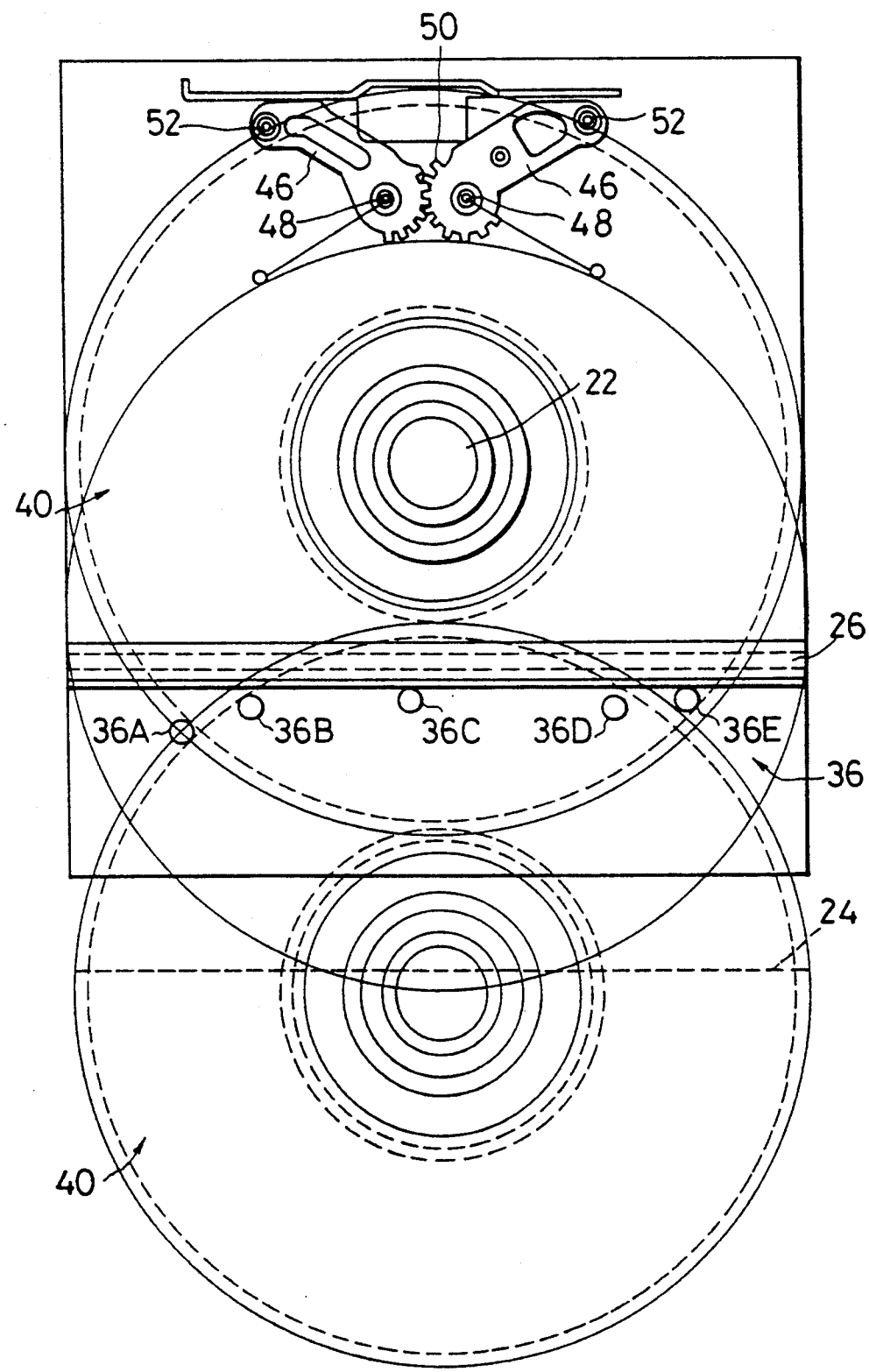
Figure 9:
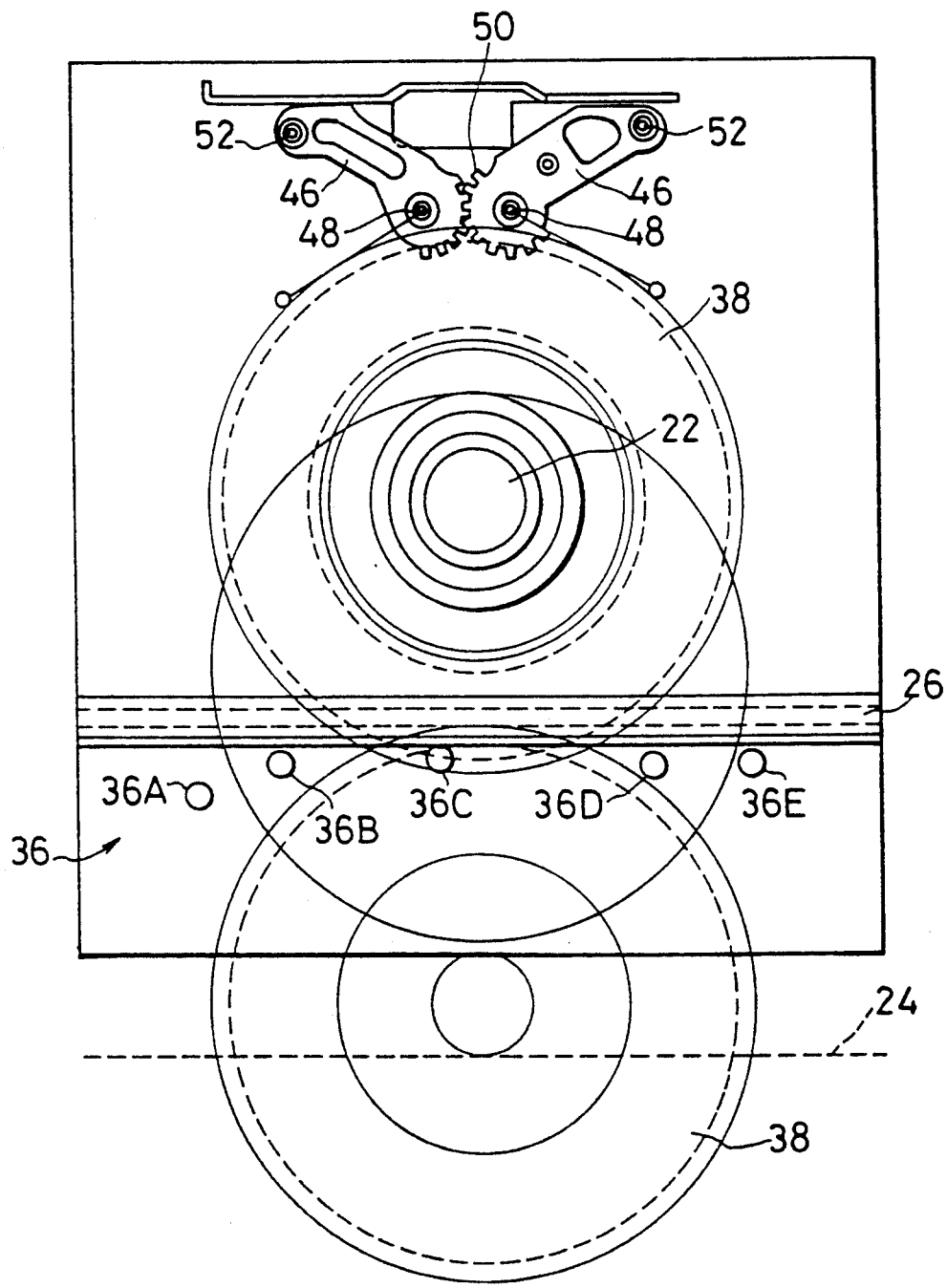

When the first and second end sensors 36A and 36E concurrently exhibit the detection mode during the disc loading operation as shown in FIG. 8, it is judged that an article inserted is a 12 cm disc. At this time, the sensor group supplied the 12 cm disc mode command to the solenoid, so that the position regulating plate is released from restraint by the solenoid. This causes the stopper pins 52 to be forced by the inserted disc, so that the stopper arms 46 may be symmetrically pivotally moved through gears 50, resulting in the stopper pins 52 being moved rearward of the 8 cm disc position.

(3) Judgment of Insertion of Only 8 cm Disc Adapter

Figure 10:
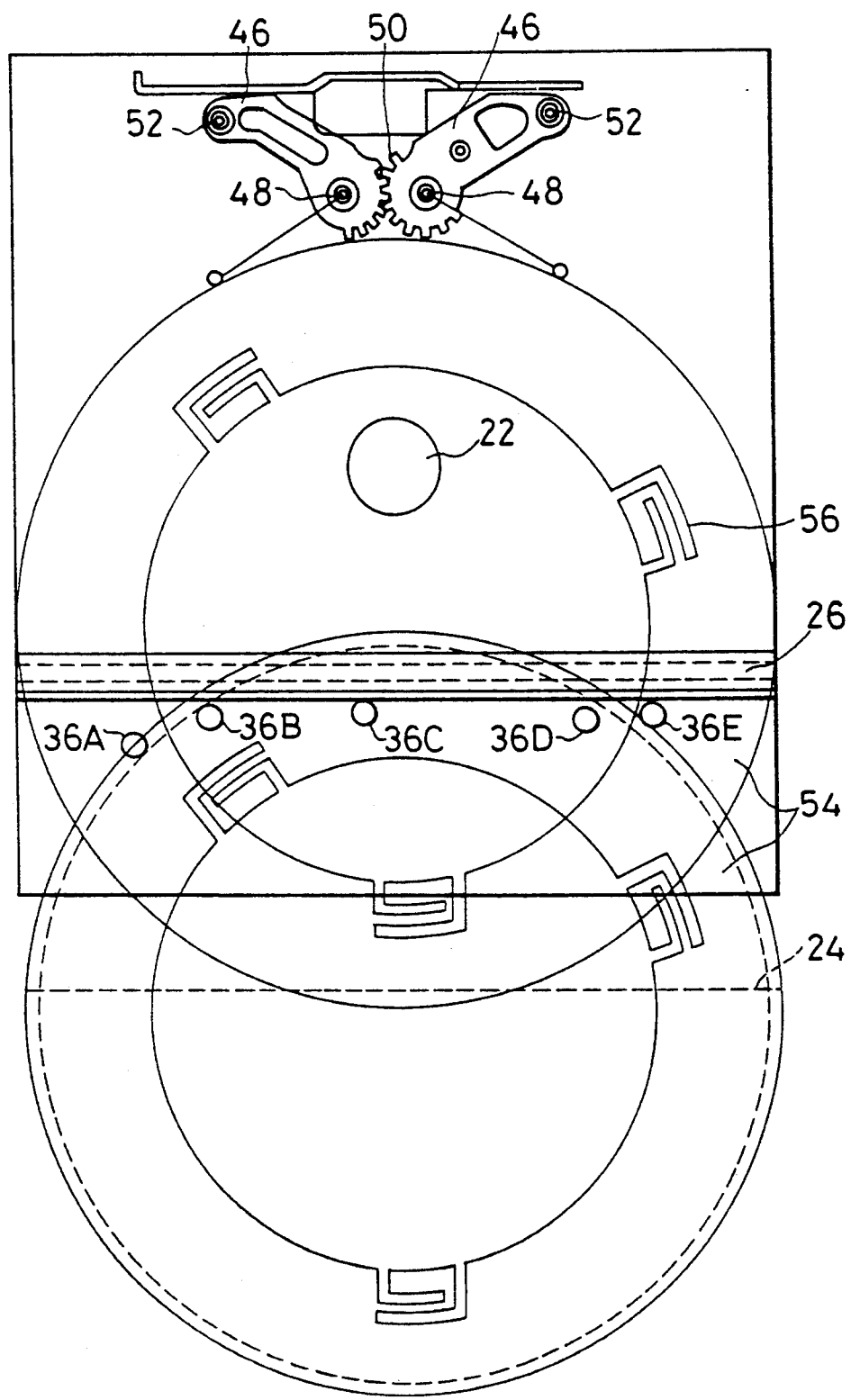

When the first and second end sensors 36A and 36E concurrently exhibit the detection mode and the remaining sensors 36B, 36C and 36D exhibit the non-detection mode as shown in FIG. 10, it is judged that only an adapter 54 for the 8 cm disc is inserted. More particularly, the adapter 54 is formed with a central aperture for fixedly holding the 8 cm disc, the three intermediate and central sensors 36B to 36D may concurrently exhibit the non-detection mode; however, when the 12 cm disc is inserted, the three sensors 36B to 36D may not concurrently exhibit the non-detection mode. Therefore, the above-described mode pattern causes an ejection command to be supplied to the loading motor, to thereby reverse the transfer roller 26, resulting in the adapter 54 being removed through the disc port 24.

(4) Judgment of Completion of Insertion of 8 cm Disc

When an article inserted is kept abutted against the stopper pins 52 over a predetermined period of time while only the central sensor 36C exhibits the detection mode and the remaining sensors 36A, 36B, 36D and 36E exhibit the non-detection mode during the 8 cm disc loading operation, it is judged that the inserted article is an 8 cm disc. Then, the completion of insertion of the disc is detected and it is placed on a turntable.

(5) Judgment of Completion of Insertion of 12 cm Disc

When the stopper arms 46 are released from constraint by the solenoid to cause an article inserted to forcibly rearwardly move the stopper pins 52, the stopper arms 46 engage the position regulating plate to hold the stopper pins 52 at a 12 cm disc position. Then, when the inserted article is kept abutted against the stopper pins 52 over a predetermined period of time while only the first end sensor sensor 36A exhibits the non-detection mode and the second end sensor 36E and central sensor 36C exhibit the detection mode, it is judged that the inserted article is a 12 cm disc. Then, the completion of insertion of the disc is detected and it is placed on a turntable.

The 8 cm disc adapter 54 is often formed near the central portion thereof with slits 56 as shown in FIG. 10, which cause light from a light emitting diode to leak therethrough, so that there is a possibility that the intermediate sensors 36B and 36D exhibit the non-detection mode. Thus, the completion of insertion of the 12 cm disc is judged by only the sensors 36A, 36C and 36E while the mode exhibited by each of the intermediate sensors 36B and 36D is ignored.

Thus, it will be noted that the illustrated embodiment permits the 8 cm disc adapter to be accurately discriminated from the 8 cm and 12 cm arrangement of the embodiment that a plurality of disc detecting sensors are disposed in proximity to the transfer roller.

Figure 11:
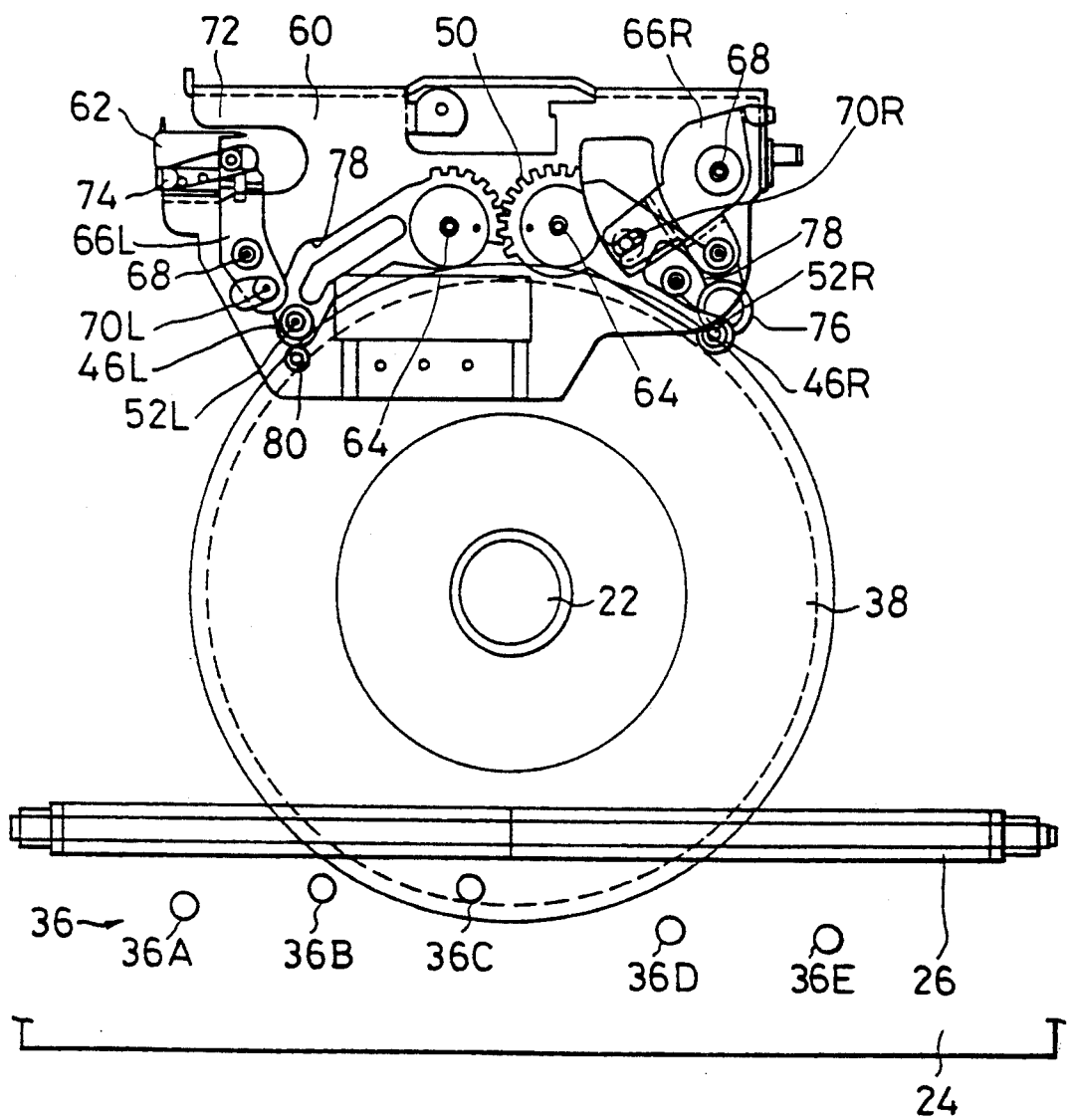
FIGS. 11 to 13 are plan views showing an essential part of a further embodiment of a disc loading structure according to the present invention.
Figure 12:
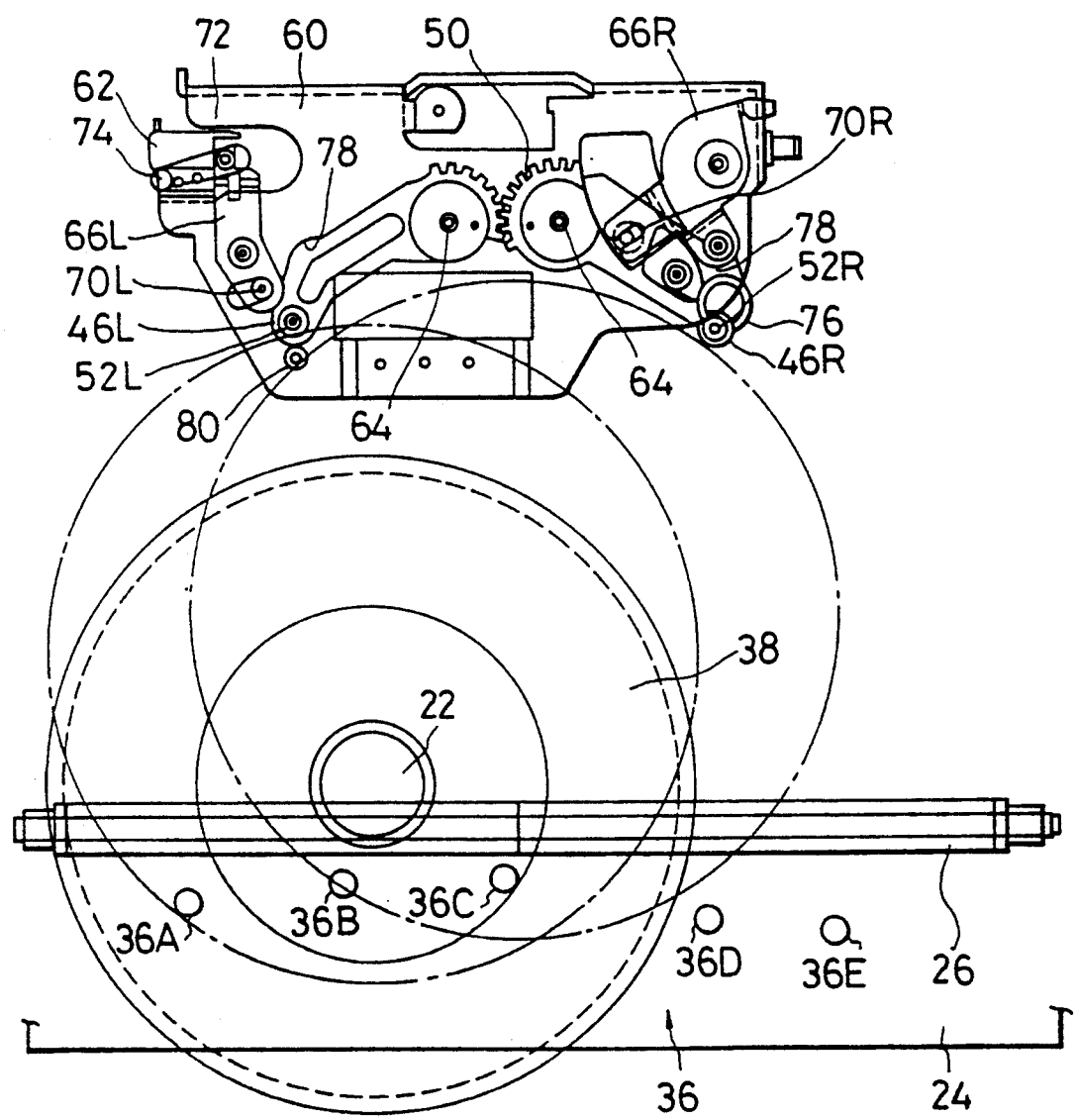
Figure 13:
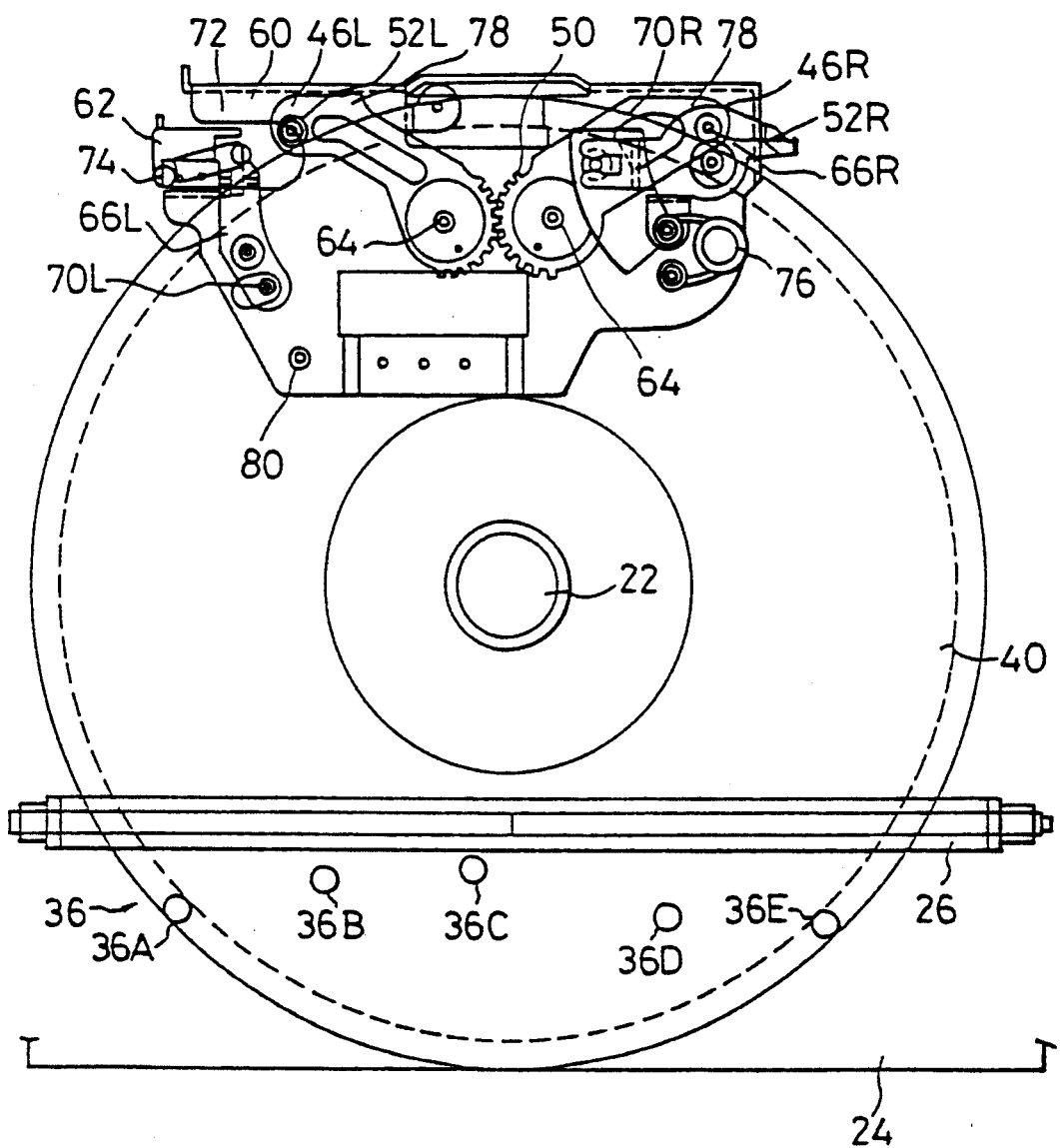

FIGS. 11 to 13 show another embodiment of a disc loading structure according to the present invention, which is adapted to accurately discriminate two or more discs different in size from each other as well as accomplish the advantages of the above-described embodiments. A disc FIGS. 11 to 13 show another embodiment of a disc loading structure according to the present invention, which is adapted to accurately discriminate two or more discs different in size from each other as well as accomplish the advantages of the above-described embodiment. A disc loading structure of the illustrated embodiment likewise includes a sensor group, which comprises five disc detecting sensors, wherein first and second end sensors 36A and 36E are so arranged that a lateral distance therebetween is defined so as to be somewhat larger than the diameter of an 8 cm disc 38, and also the end sensor 36A is arranged so as to be spaced from a vertical line extending through the center of a turntable 22 by a distance larger than the distance between the second end sensor 36E and the vertical line, to thereby prevent the outer periphery of a 12 cm disc 40 from reaching the first end sensor 36A when the 12 cm disc is placed on the turntable 22.

The illustrated embodiment also includes a sub-housing 60 arranged rearward of a transfer roller 26 and the turntable 22, which is provided with a solenoid 62 adapted to be operated by an 8 cm disc signal or a 12 cm disc signal generated from the sensor group 36 consisting of the sensors 36A to 36E. In the illustrated embodiment, the solenoid 62 is arranged on the left side of the rear portion of the sub-housing 60. Also, the sub-housing 60 is provided with a pair of stopper arms 46L and 46R, which are arranged opposite to each other in the lateral direction so as to serve as a disc holding means. The stopper arms 46L and 46R are formed on the portions of the proximal ends thereof opposite to each other with gears 50, through which they are operatively connected to or engaged with each other. Also, the stopper arms 46L and 46R are adapted to be pivotally moved about support pins 64 symmetrically. The stopper arms 46L and 46R are provided at the distal ends thereof with stopper pins 52L and 52R, respectively, which are adapted to be abutted against the outer periphery of an 8 cm disc 38 and that of a 12 cm disc 40 to position the discs, as shown in FIGS. 11 and 13.

Also, the structure of the illustrated embodiment includes a pair of pivotal movement regulating plates 66L and 66R which are arranged between the solenoid 62 and the stopper arm 46L on the left side and rearward of the stopper arm 46R on the right side so as to be pivotally movable about support shafts 68, respectively. The pivotal movement regulating plate 66L on the left side is provided at the distal end thereof with a pivotal movement regulating pin 70L, which is adapted to be abutted against the stopper arm 46L to regulate it to a forward operation position. The stopper arm 46R on the right side is provided at the intermediate portion thereof with a pivotal movement regulating pin 70R, which is engaged with the distal end of the pivotal movement regulating plate 66L to cause it to be pivotally moved in association with the pivotal movement of the stopper arm 46R. The pivotal movement regulating plate 66L is connected to a movable element 72 of the solenoid 62 and forced in the counterclockwise direction by means of a spring 74. Thus, when the solenoid 62 is turned on, the pivotal movement regulating plate 66L is held at a pivotal movement regulating position in the counterclockwise direction as shown in FIG. 12 to regulate the stopper arm 46L to a first operation position shown in FIG. 11; whereas, when the solenoid 62 is turned off, the regulating plate 66L is rendered pivotally movable to permit the stopper arm 46L to be pivotally moved. The regulating plate 66R on the right side is engaged at one end thereof with one end of a reverse spring 76, of which the other end is connected to the sub-housing 60. The reverse spring 76, when the regulating plate 66R is at a position in the counterclockwise direction based on a substantially central position of its pivotal stroke as shown in FIG. 12, serves to further force the plate in the counterclockwise direction and, when the regulating plate is at a position in the clockwise direction based on the substantially central position of the pivotal stroke as shown in FIG. 13, serves to further force it in the clockwise direction.

When the stopper arms 46L and 46R are pivotally moved in the rearward direction or in the upward direction in FIG. 11, they are prevented from being further pivotally moved because an abutment section 78 of each of the stopper arms which is provided on the rear side of the arm is abutted against the sub-housing 60 to cause each stopper arm to be regulated to a second operation position as shown in FIG. 13. Also, the stopper arm 46L, as shown in FIG. 12, is forwardly regulated to the first operation position and prevented from being further pivotally moved in the forward direction from the first operation position by an arm stopper pin 80 fixed on the sub-housing 60.

Also, the illustrated embodiment, when a disc inserting operation is completed, is adapted to cause a chucking or clamping means (not shown) such as a chucking or clamping plate or the like to be started and a micro-switch to detect an operation completing position of the chucking means, resulting in completing a disc loading operation.

Figure 14:
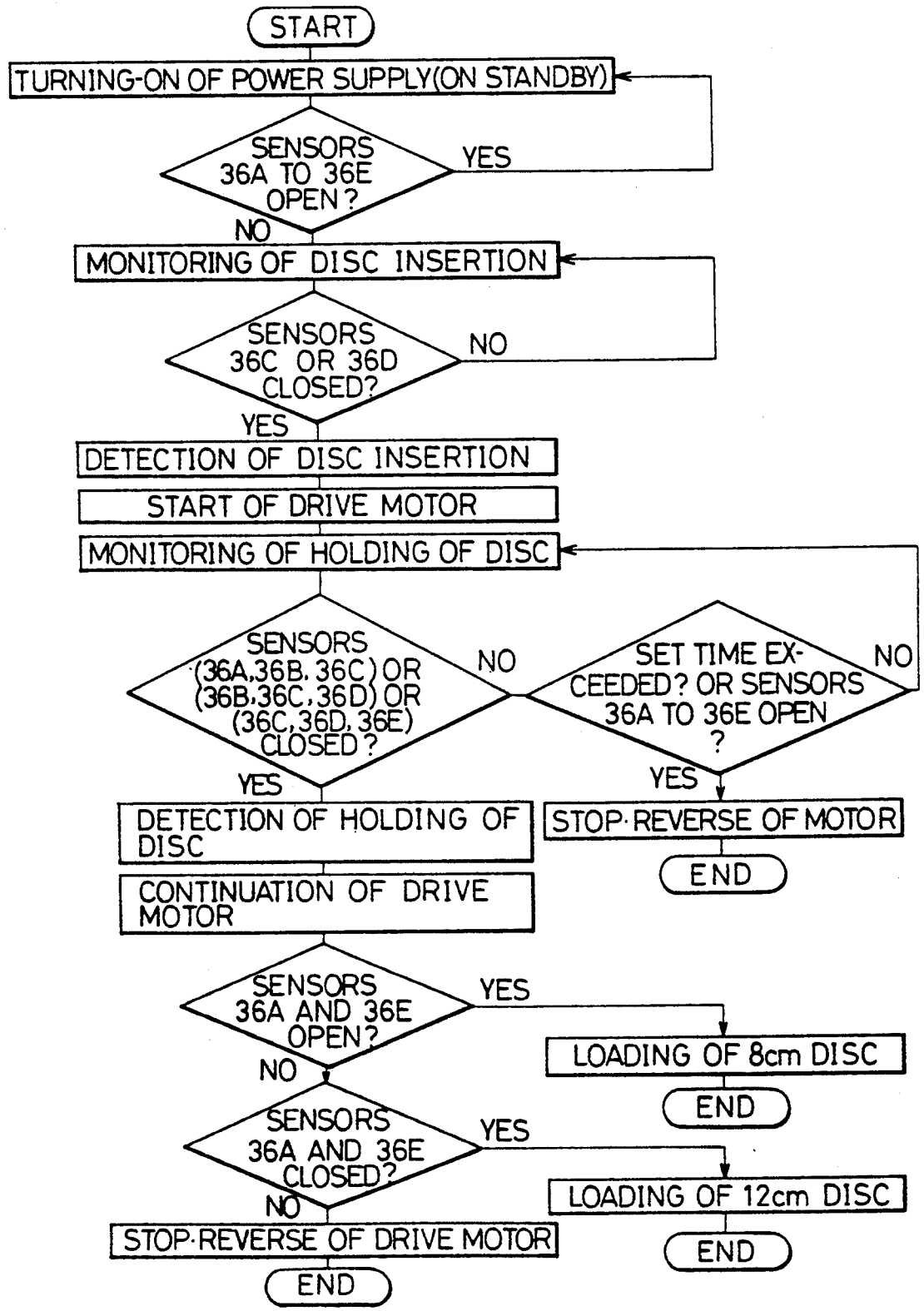
FIG. 14 is a flow chart showing the manner of operation of the disc loading structure shown in FIGS. 11 to 13.

Now, the manner of operation of the illustrated embodiment will be described hereinafter with reference to FIG. 14, wherein the words "open" and "closed" mean a non-detection mode of the sensor and its detection mode as in the preceding description, respectively.

(1) Start of Loading

When the sensors 36A to 36E each exhibit the non-detection mode at the time of turning-on of a power supply, it is judged that no disc is at a disc port. Thus, the structure is ready for loading of a disc. On the contrary, when the loading is already completed at the time of turning-on of the power supply, the structure is ready for a subsequent key operation or a loaded disc is ready for play-back.

When at least one of the central sensor 36C and intermediate sensor 36D detects the insertion of an article to exhibit the detection mode, a loading signal is supplied to a loading motor, so that the transfer roller 26 is rotated to draw the article into the structure. When all the sensors exhibit the non-detection mode, it is judged that any disc left as inserted has been taken out, so that the structure is ready for loading.

(2) Confirmation of Engagement between Transfer Roller and Compact Disc

Subsequent to the loading signal, when a combination of three sensors 36A, 36B and 36C; 36B, 36C and 36D; or 36C, 36D and 36E exhibits the detection mode, the generation of the loading signal is continued.

(3) Removal of Foreign Article

However, when any combination of the sensors other than the above-described combination takes the detection mode or a predetermined period of time (for example, 0.5 second) elapses, it is judged that any foreign article other than a predetermined disc is inserted, so that the supply of the loading signal is stopped to stop the actuation of the transfer roller 26. Also, when all the sensors exhibit the non-detection mode in the course of loading for other reasons, it is judged that a foreign article has been inserted. This results in an ejection signal being generated to reverse the transfer roller 26 to discharge the inserted foreign article.

(4) Judgment of 8 cm Disc

When the first and second end sensors 36A and 36E concurrently exhibit the non-detection mode during the disc loading operation, the structure judges that the article which has been inserted is an 8 cm disc 38 and supplies a 8 cm disc signal to the solenoid 62, so that it is turned on. The inserted 8 cm disc 38 is selectively abutted against the stopper pins 52L and 52R depending upon a position of insertion of the disc. More particularly, as shown in FIG. 12, when it is inserted from the lift side, it is abutted against the left stopper pin 52L; whereas when it is inserted from the right side, it is abutted against the right stopper pin 52R. This results in the stopper pin 52L or 52R abutted against the disc 38 being rearward forced. At this time, the solenoid 62 has been already turned on, therefore, the pivotal movement regulating plate 66L on the left side which is provided with the movable element 72 is held at the pivotal movement regulating position as shown in FIG. 12, so that the stopper arm 46L on the left side is regulated to the first operation position. This causes the right stopper arm 46R, which is operatively connected through the gears 50 to the left stopper arm 46L, to be prevented from being pivotally moved through the engagement between the gears 50, resulting in being likewise regulated to the first operation position.

(5) Judgment of 12 cm Disc

When the first and second end sensors 36A and 36E concurrently exhibit the detection mode during the loading operation, the structure judges that the article which has been inserted is a 12 cm disc 40. At this time, the sensor group supplies a 12 cm disc signal to the solenoid 62, resulting in the solenoid being turned off. The inserted 12 cm disc 40, as shown in FIG. 13, is abutted against the stopper pin 52L or 52R to rearward force it. At this time, the solenoid 62 is kept turned off, therefore, the pivotal movement regulating plate 66L on the left side on which the movable element 72 is mounted is kept movable, so that the left stopper arm 46L and right stopper arm 46R operatively connected to the arm 46L may be kept pivotally movable.

More particularly, at the time when the 12 cm disc 40 is abutted against the stopper pin 52L or 52R, both stopper arms 46L and 46R are kept movable, so that the 12 cm disc 40 forces the stopper arms in the rearward or loading direction. The left pivotal movement regulating plate 66L, during the first half of operation of the left stopper arm 6L, is kept engaged with the stopper arm 46L, to thereby be forced against it, resulting in being pivotally moved against the spring 74 in the clockwise direction. During the second half of the operation, it is disengaged from the stopper arm 46L, to thereby be returned lo the original in the counterclockwise direction due to the action of the spring 74 as shown in FIG. 13. The pivotal movement regulating plate 66R on the right side, during the first half of operation of the right stopper arm 46R, is kept engaged with the stopper arm 46R, so that it is forced against the stopper arm 46R. Thus, the plate 66R is pivotally moved in the clockwise direction against the reverse spring 76. After the spring 76 reverses, the reversing force of the spring causes the rotation of the plate 66R in the clockwise direction to be continued. The 12 cm disc 40 which is inserted into the structure while forcing the stopper arms 46L and 46R is then stopped when the abutment section 78 of each of the stopper arms is abutted against the surface of the sub-housing 60 and thereafter placed on the turntable 22.

(6) Judgment of Disc of 12 cm Diameter and 8 cm Deposition Diameter

In view of a compact disc player which fails to handle an 8 cm compact disc, there is manufactured and sold a compact disc which is 12 cm in diameter and 8 cm in deposition diameter. When the compact disc of this type is inserted into the disc loading structure of the illustrated embodiment, the first and second end sensors 36A and 36E fail to exhibit the detection mode because the outer periphery of the disc is light-permeable, so that the stopper arms 46L and 46R are held at the 8 cm disc position. This causes the disc to be stopped due to the abutment against the stopper pins 52 prior to the completion of the insertion, irrespective of actually having a diameter of 12 cm. At this time, the central sensor 36C and intermediate sensors 36B and 36D detect the 8 cm deposition section, resulting in exhibiting the detection mode. Actually, the central sensor 36C is not considered in view of the fact that the central portion of the disc is light-permeable. When this is continued over a predetermined period of time, constraint by the solenoid 62 is released so that the disc rearwardly forces the stopper arms 46L and 46R from the first operation position to the second operation position.

The remaining part of the embodiment may be constructed in substantially the same manner as the above-described embodiment.

Figure 15:
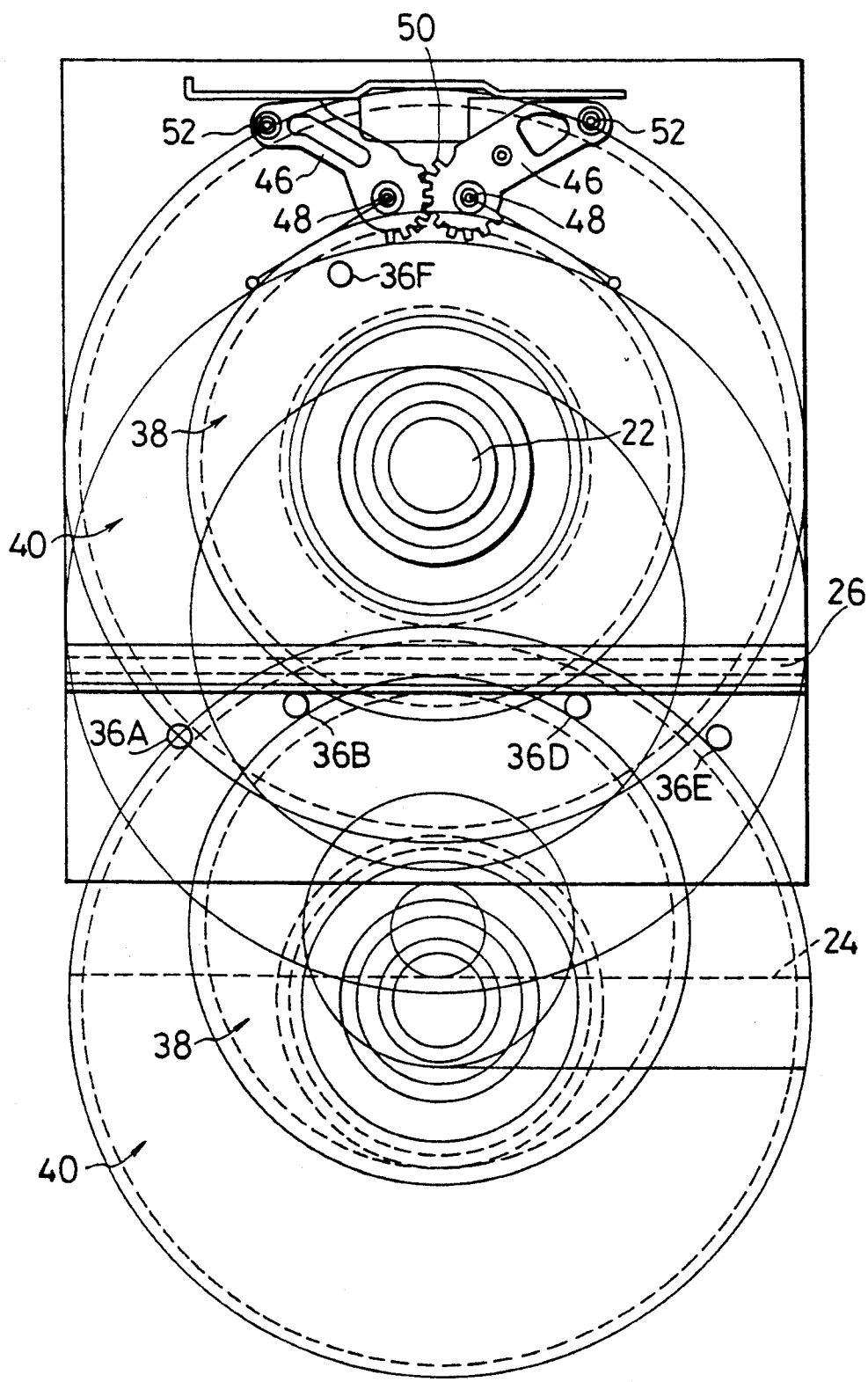
FIG. 15 is a plan view showing a modification of the disc loading structure shown in FIGS. 11 to 13.

FIG. 15 shows a modification of the embodiment described above with reference to FIGS. 11 to 13. In the modification, four front sensors are arranged in front of a transfer roller 26 and one rear sensor is arranged rearward of the roller 26, as in the disc loading structure shown in FIG. 5.

The front sensors comprises two end or outer sensors 36A and 36E and two intermediate or inner sensors 36B and 36D, which are so arranged that the outer sensors 36A and 36E are laterally spaced by a distance of 12 cm or less from each other and the inner sensors 36B and 36D are laterally spaced by a distance of 8 cm or less from each other. The rear sensor is designated by reference character 36F and arranged in such a manner that when an 8 cm disc 38 is placed on a turntable 22, it is positioned inside the outer periphery of the disc. The disc detecting sensors 36A to 36E exhibit the same detection and non-detection modes as those of the embodiment shown in FIGS. 11 to 13.

Now, the manner of operation of the modification will be described hereinafter.

(1) Judgment of 8 cm Disc

The structure judges that an article which has been inserted is a 8 cm disc 38 when both inner sensors 36B and 36D concurrently exhibit the detection mode, to thereby supply an 8 cm disc signal to a solenoid. The subsequent operation is carried out in the same manner as the above-described embodiment.

The inner sensors 36B and 36D are arranged rearward as compared with the outer sensors 36A and 36E; therefore, in order that both inner sensors 36B and 36D exhibit the detection mode, it is required that the outer periphery of the 8 cm disc 38 must be somewhat engaged with the transfer roller 26. This permits the loading to be positively carried out without causing a disadvantage that the transfer roller 26 continues useless rotation while the disc is left as inserted at a disc port 24. Also, the inner sensors 36B and 36D functioning to start the loading are arranged in a manner to positionally correspond to the center of the disc port 24 or its vicinity. Such arrangement effectively prevents the specular surface of the disc from being damaged due to its sliding on the transfer roller 26, because it is not required to slide the disc in the direction of center of the turntable 22 when it is inserted into the structure.

(2) Judgment of 12 cm Disc

The structure judges that an article which has been inserted is a 12 cm disc when all the sensors 36A to 36F simultaneously exhibit the detection mode. At this time, the solenoid is turned off. The subsequent operation may be carried out in the same manner as the above-described embodiment.

Thus, it will be noted that the embodiment shown in FIGS. 11 to 15 accurately discriminates two or more discs different in size by only the arrangement of the sensors exhibiting the detection or non-detection mode in a simple manner.

Figure 16:
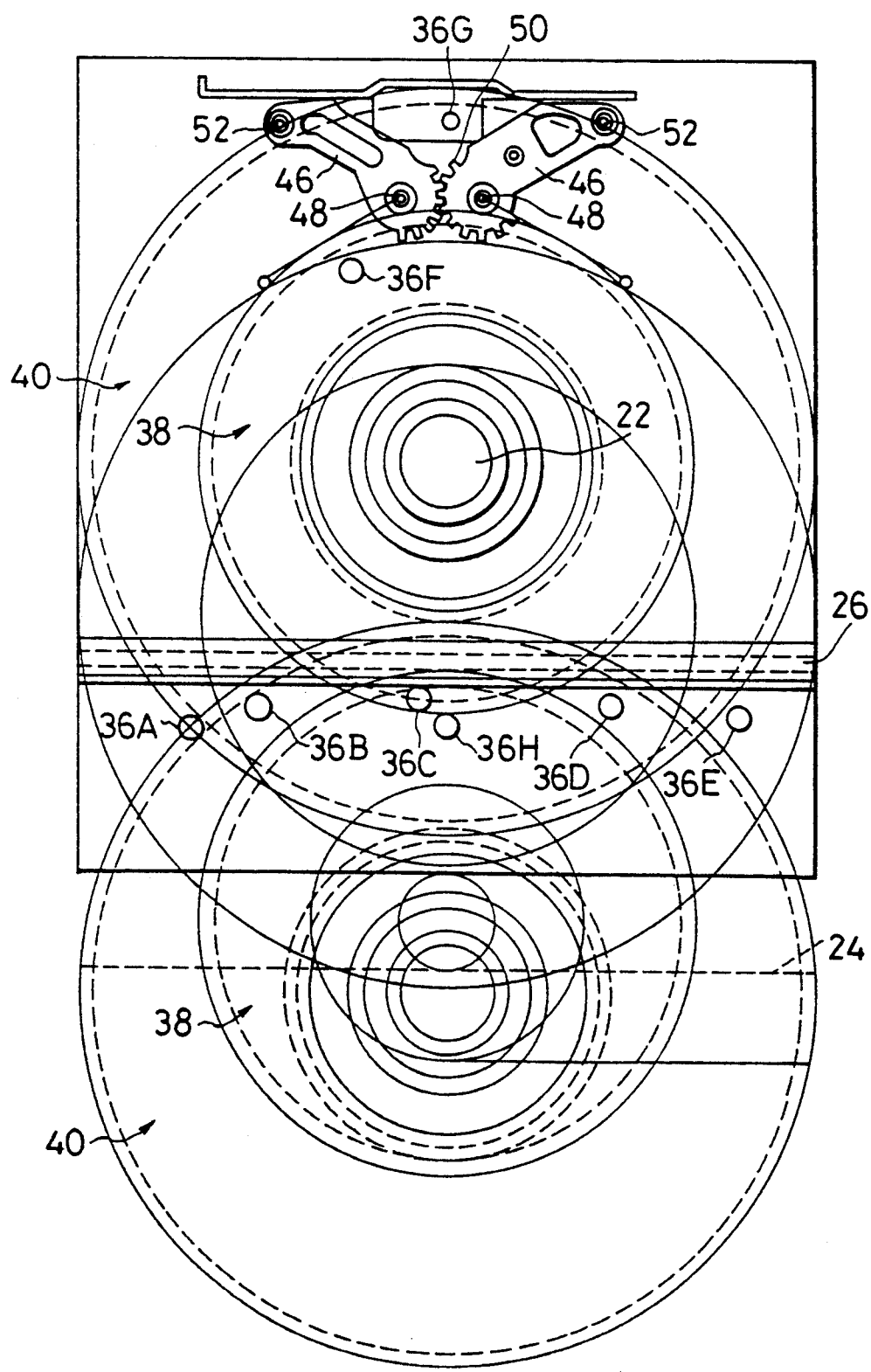
FIG. 16 is a plan view showing still another embodiment of a disc loading structure according to the present invention.

FIG. 16 shows a further embodiment of a disc loading structure according to the present invention, which is adapted to not only exhibit the advantages of the embodiment shown in FIG. 3 but ensure positive and safe handling of a disc in a housing. A disc loading structure of the illustrated embodiment includes, in addition to five sensors 36A to 36E arranged forward of a transfer roller 26, three sensors 36F to 36H arranged forward and rearward of the transfer roller 26. The forefront sensor 36H is arranged forward of the central sensor 36C, and the rear sensor 36F and rearmost sensor 36G are arranged rearward of the roller 26 as in the structure shown in FIG. 6. More particularly, the first and second end sensors 36A and 36E are arranged so as to be spaced by a distance somewhat larger than 8 cm from each other in the lateral direction of the structure and be away from the outer periphery of a 12 cm disc 40 when it is set on a turntable 22. A distance between the intermediate sensors 36B and 36D is set to be smaller than 8 cm. The central sensor 36C is arranged so as to be positioned inside the outer periphery of an 8 cm disc 38 when it is set on the turntable 22.

The forefront sensor 36H is arranged so as to be positioned outside the 8 cm disc when it is set on the turntable. The sensors 36F and 36G arranged rearward of the transfer roller 26, as shown in FIG. 16, are so arranged that the sensor 36F is positioned inside the outer periphery of the 8 cm disc 38 when it is placed on the turntable 22 and the sensor 36G is positioned outside the 8 cm disc 38 but inside the outer periphery of the 12 cm disc 40 when they are placed on the turntable 22.

The remaining part of the illustrated embodiment may be constructed in substantially the same manner as the embodiment shown in FIG. 3 or FIGS. 10 to 13.

Now, the manner of operation of the above-described embodiment will be described hereinafter.

(1) Start of Loading of Disc

When the forefront sensor 36H detects the insertion of a disc into the structure after turning-on of a power supply, to thereby exhibit the detection mode, a disc loading command is generated to cause the transfer roller 26 to draw it into the structure. At this time, a size of the disc inserted may be discriminated depending upon a pattern of combination of the detection and/or non-detection modes of the sensors 36A to 36E, for example, as in the embodiment described above in connection with FIGS. 10 to 13.

(2) Completion of Insertion of 8 cm Disc

During loading of the 8 cm disc 38, when the central sensor 36C and sensor 36F exhibit the detection mode and the sensors 36A, 36B, 36D, 36E and 36K each exhibit the non-detection mode while the disc 38 is abutted against stopper pins 52 of stopper arms 46 regulated to a first operation position or 8 cm disc position, the structure detects that the insertion of the 8 cm disc 38 is completed.

If the 8 cm disc is moved in the lateral direction at a disc port 24 or drawn out when it is to be inserted into the structure, it is considered that only the central sensor 36C exhibits the detection mode. Also, when the article inserted into the structure is foreign from a predetermined disc, it is considered that only the central sensor 36C likewise exhibits the detection mode. Thus, when only the central sensor 36C is used for detecting the completion of insertion of the 8 cm disc, there is a possibility that the structure carries out malfunction.

However, in the illustrated embodiment, the completion of insertion of the 8 cm disc 38 is detected only when both central sensor 36C and rear sensor 36F exhibit the detection mode. Thus, the embodiment effectively prevents a chucking or clamping means from starting even if only the central sensor 36C erroneously takes the detection mode, resulting in the completion of insertion of the 8 cm disc being carried out only when it is accurately placed at a predetermined position on the turntable 22.

(3) Completion of Insertion of 12 cm Disc

During loading of the 12 cm disc 40, if the rearmost sensor 36G exhibits the detection mode, both end sensors 36A and 36E exhibit the non-detection mode and the sensors 36B, 36C, 36D and 36H take the detection mode when the rearmost sensor 36G exhibits the detection mode while it is abutted against the stopper pins 52 regulated to a second operation position or 12 cm disc position; the completion of insertion of the disc is detected.

If the structure of the prior art is so set that the completion of insertion of the 12 cm disc is detected when only the rearmost sensor 36G exhibits the detection mode, a chucking means possibly carries out malfunction. Also, even when the prior art is so set that the detection of completion of the insertion takes place on the assumption that both end sensors 36A and 36E take the non-detection mode, there is a possibility that the chucking means will malfunction when a foreign article other than the disc is inserted or the disc is erroneously or accidentally moved. On the contrary, in the illustrated embodiment, as described above, the detection of completion of the insertion is accomplished only when the end sensors 36A and 36E exhibit the non-detection mode and the rearmost sensor 36G exhibits the detection mode.

Thus, in the illustrated embodiment, the insertion completion detecting means comprises the first sensor group section and second sensor group section respectively arranged inside and outside the outer periphery of the disc set on the turntable, and the insertion detection is detected when the first sensor group section exhibits the detection mode and the second sensor group section takes the non-detection mode. Thus, the first and second sensor group sections are variable therebetween depending upon the size of the disc.

Figure 17:
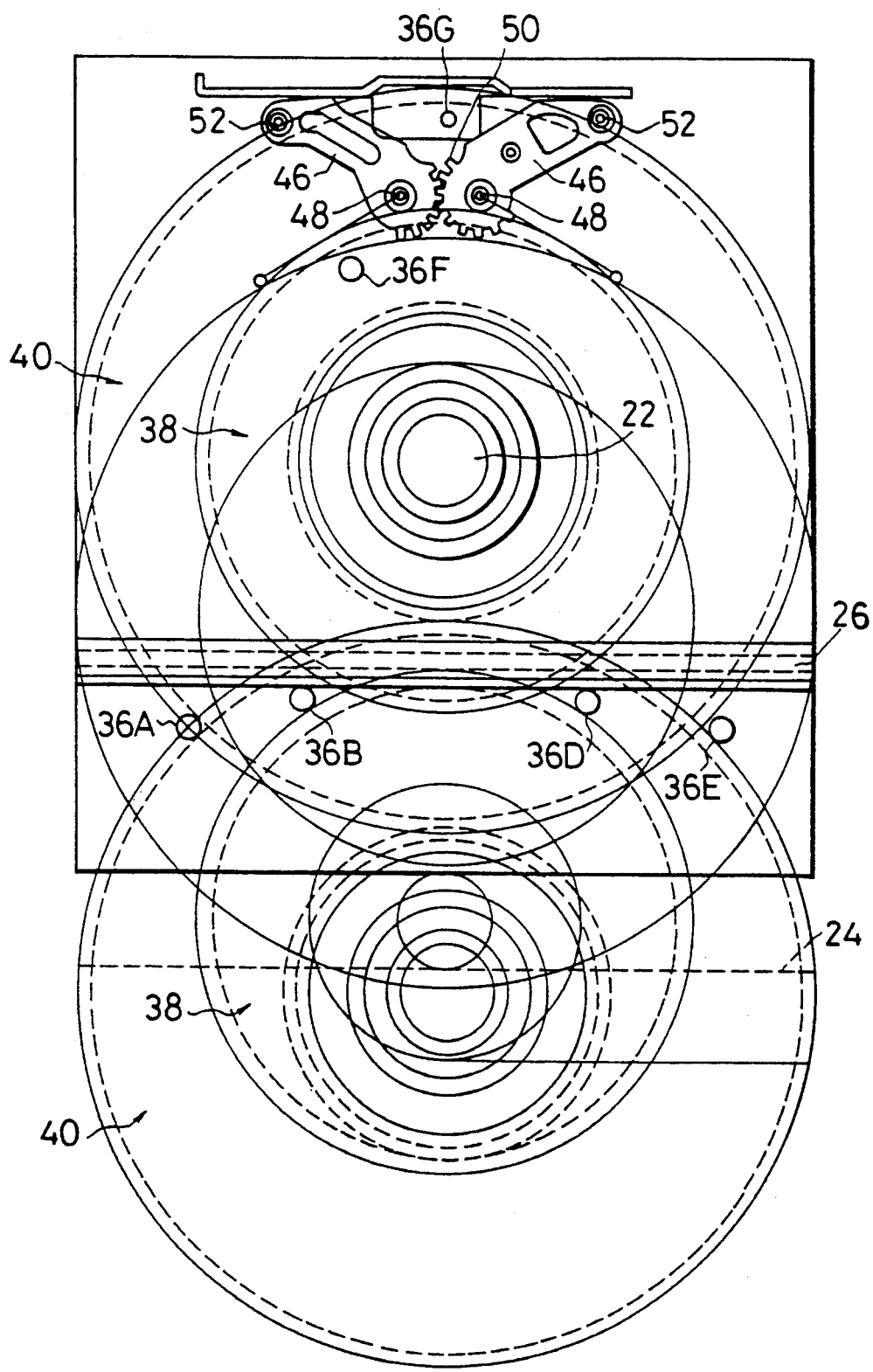
FIG. 17 is a plan view showing a modification of the disc loading structure shown in FIG. 16.

FIG. 17 shows a modification of the embodiment described above with reference to FIG. 16. A disc loading structure of the modification includes four sensors 36A, 36B, 36D and 36E arranged forward of a transfer roller 26 and two sensors 36F and 36G arranged rearward of the transfer roller 26. The end or outer sensors 36A and 36E are arranged so as to be laterally spaced from each other by a distance of 12 cm or less, so that they take the non-detection mode when the insertion of a 12 cm disc 40 into the structure is completed. The two intermediate or inner sensors 36B and 36D are provided in proximity to the transfer roller 26 and in a manner to be laterally spaced from each other by a distance of 8 cm or less. Also, the sensors 36B and 36D are arranged at positions where they exhibit the non-detection mode when the insertion of an 8 cm disc 38 is completed. The rear sensor 36F is positioned so
as to be inside the outer periphery of the 8 cm disc 38 when it is set on a turntable 22, and the completion of insertion of the 8 cm disc is detected when it takes the detection mode. The rearmost sensor 36G is positioned outside the 8 cm disc 38 but inside the outer periphery of the 12 cm disc 40 when they are set on the turntable 22 and the completion of insertion of the 12 cm disc 40 is detected when it takes the detection mode.

The remaining part of the modification may be constructed in substantially the same manner as the embodiment of FIG. 16.

Now, the manner of operation of the modification will be described hereinafter.

When both inner sensors 36B and 36D simultaneously exhibit the detection mode, a disc loading command is supplied to the transfer roller 26, so that the transfer roller 26 is rotated to draw an inserted disc into the structure. When any one of the four front sensors 36A to 36E takes the detection mode, the supply of the loading command is continued.

When the rear sensor 36F exhibits the detection mode and all the front sensors 36A to 36E take the non-detection mode, the inserted disc is judged to be an 8 cm disc and the insertion of the disc is completed.

When the rearmost sensor 36G exhibits the detection mode, the intermediate sensors 36B and 36D exhibit the detection mode and the end sensors 36A and 36E take the non-detection mode; the insertion of a 12 cm disc is completed.

Thus, the embodiment of FIGS. 16 and 17 permits handling of a disc in the structure such as the completion of insertion of a disc to be positively detected through the simple construction that a plurality of the sensors are arranged inside and outside the outer periphery of a disc set on the turntable.

The embodiments described above each may be constructed so as to improve a feeling of the operation as well as exhibit the foregoing advantages. Now, the improvement will be described in connection with the embodiment shown in FIG. 7.

The central sensor 36C is arranged so as to be first closed by the deposited section 38a of the 8 cm disc 38 or the deposited section 40a of the 12 cm disc 40 when the 8 cm disc 38 is inserted through the center of the disc port 24 into the structure or the 12 cm disc 40 is inserted. The first and second intermediate sensors 36B and 36D are positively closed by the deposited section 38a of the 8 cm disc 38 or the deposited section 40a of the 12 cm disc 40 when the 8 cm disc is inserted through the center of the disc port 24 or the 12 cm disc is inserted. When the 8 cm disc is inserted into the structure while substantially deviating in the lateral direction from the center of the disc port 24, the intermediate sensor 36B or 36D positioned in the direction opposite to the deviation is open. However, when the deviation is not significant or large, both sensors 36B and 36D are kept closed. The central sensor 36C is disposed so as to somewhat deviate in the left direction from the vertical line extending through the center of the turntable 22 in FIG. 7; therefore, when the 8 cm disc 38 is inserted while substantially deviating in the left direction in FIG. 7, the first intermediate sensor 36B is closed substantially concurrent with the central sensor 36C, whereas when it substantially deviates in the right direction, the second intermediate sensor 36D is closed prior to the central sensor 36C.

Figure 7:
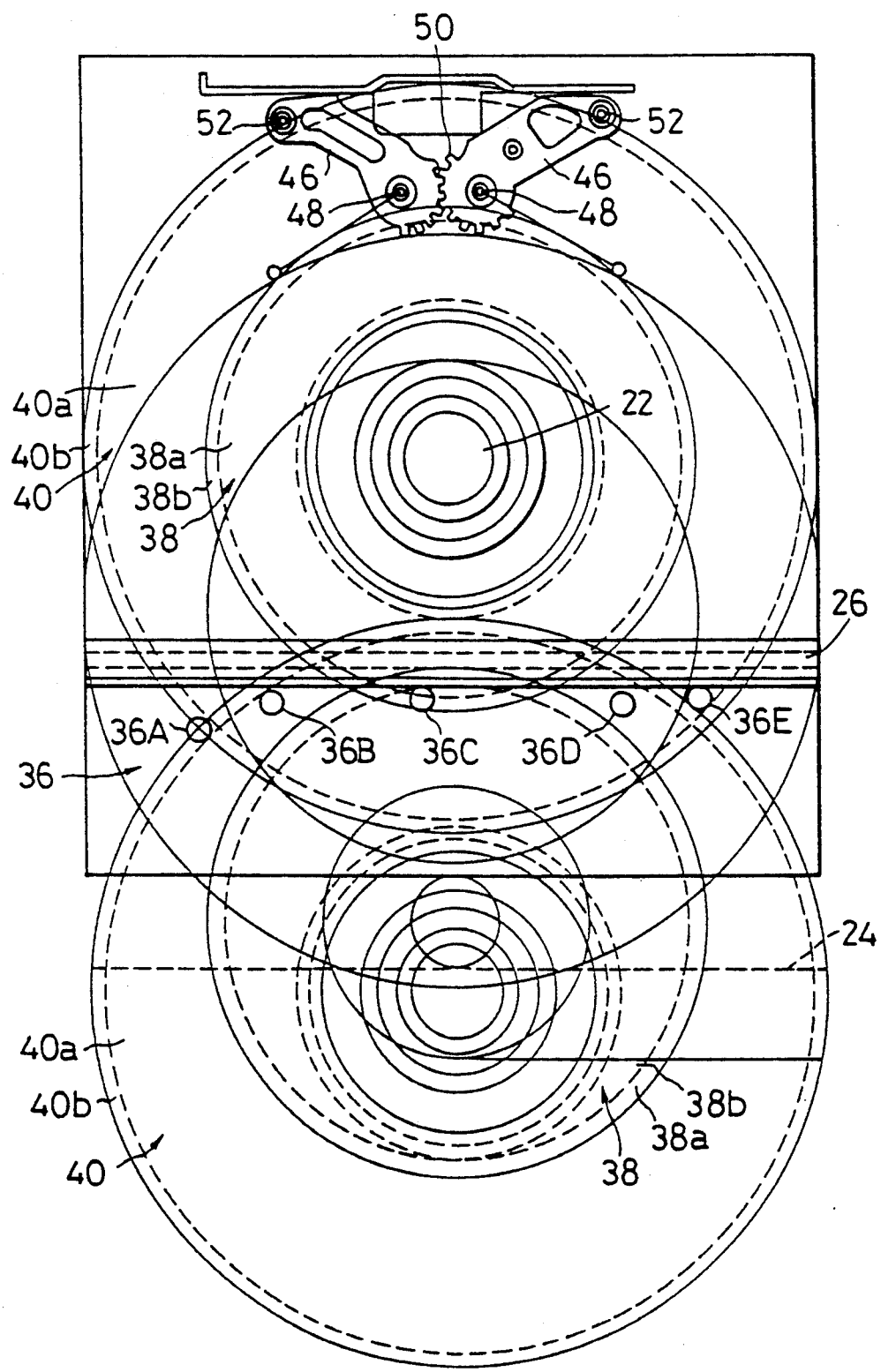
FIGS. 7 to 10 are plan views showing another embodiment of a disc loading structure according to the present invention.

The first and second end sensors 36A and 36E are disposed so as to be positively closed by the deposited section 40a of the 12 cm disc 40 when it is inserted. Also, both sensors 36A and 36E are arranged so as to be laterally spaced by a distance larger than the diameter of the 8 cm disc 40 from each other, so that at least one of them is open when the 8 cm disc is inserted. More particularly, as shown in FIG. 7, when the 8 cm disc is inserted through the center of the disc port 24, both end sensors 36A and 36E are open. When it is inserted while deviating in the left or right direction, the end sensor on the same side is closed but the end sensor on the opposite side is positively open.

Also, when the 12 cm disc 40 or 8 cm disc 38 is kept held on the transfer roller 26, at least three such sensors adjacent to each other are closed. When the 8 cm disc 38 inserted through the center of the disc port 24 or the 12 cm disc 40 is held by the transfer roller 26, the centrally positioned three sensors 36B, 36C and 36D are closed. When the 8 cm disc is held on the transfer roller 26 while deviating in the left direction, the centrally positioned three sensors 36B, 36C and 36D or left three sensors 36A, 36B and 36C are closed or four sensors 36A, 36B, 36C and 36D are closed. When the 8 cm disc is held on the transfer roller 26 while deviating in the right direction, the centrally positioned three sensors 36B, 36C and 36D or right three sensors 36C, 36D and 36E are closed or four sensors 36B, 36C, 36D and 36E are closed.

Figure 18:
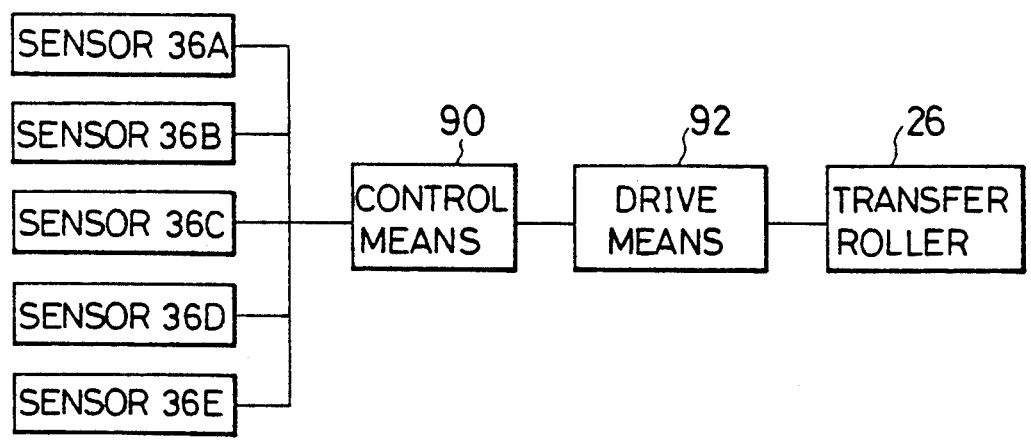
FIG. 18 is a block diagram showing a still further embodiment of a disc loading structure according to the present invention.

To the sensors 36A to 36E may be connected a drive means 92 in a manner as shown in FIG. 18. The control means 90 is adapted to judge the insertion of the disc depending upon a combination of detection signals supplied from the sensors to start a drive means or motor 92, to thereby rotate the transfer roller 26. In the control means 90, a predetermined period of time is set which initiates at the time when the insertion is detected. The time is set to be longer than at lest a period of time between the detection of insertion of the disc and the disc holding by the transfer roller. Also, the control means 90 detects, depending upon a combination of detection signals supplied from the sensors after the detection of insertion of the disc, whether the disc is held by the transfer roller 26. When it is judged that the holding is carried out within the set time, the actuation of the drive means 92 is continued; whereas when it is judged that it is not carried out, the drive means 92 is stopped.

Now, the manner of operation of the structure will be described hereinafter with reference to FIG. 19.

(1) Monitoring of Insertion of Disc (Standby for Loading)

For the purpose of monitoring the insertion of a disc, only the central sensor 36C and a second intermediate sensor 36D are turned on and the remaining sensors 36A, 36B and 36E are kept turned off. In a mounted-type acoustic equipment, it is required that a compact disc player mounted on a vehicle is ready for operation even when an engine of the vehicle is under non-operative conditions. However, the consumption of electric power must be minimized in view of the capacity of a battery of the vehicle. Thus, in the embodiment, only the sensors 36C and 36D which are initially closed during the disc insertion as described above are kept turned on.

(2) Detection of Insertion of Disc

As described above, it is judged that the insertion of the disc is accomplished when at least one of the central sensor 36C and second intermediate sensor 36D is closed during monitoring of the insertion. Then, the sensors 36A, 36B and 36E are immediately turned on to start monitoring of holding of the disc by the transfer roller 26 and start the drive means 92 to lead to rotation of the transfer roller 26.

(3) Detection of Holding of Disc

When at least three adjacent sensors 36A, 36B and 36C; 36B, 36C and 36D; or 36C 36D and 36E are closed within the predetermined set time initiating at the time when the disc insertion is detected, to thereby generate the detection signal, it is judged that the disc inserted is held by the transfer roller 26, so that the actuation of the drive means is continued. The transfer roller 26 is previously rotated, so that loading of the disc is smoothly started without causing any shock at the time when the holding is carried out, resulting in improving the operation.

(4) Non-Detection of Holding of Disc

When at least three adjacent sensors described above are not closed within the set time, it is judged that the disc insertion is not sufficient to cause it to be held by the transfer roller 26, so that the actuation of the drive means 92 is stopped. Thus, the drive means is effectively prevented from being uselessly actuated.

As will be noted from the foregoing, in the illustrated embodiment, the central sensor 36C and second intermediate sensor 36D function to carry out both detection of insertion of the disc and detection of holding of the disc by the transfer roller and the remaining sensors 36A, 36B and 36E function to carry out only the detection of the holding.

Alternatively, as shown in FIG. 16, the sensor 36H may be provided forward of the central sensor 36C for detecting only the disc insertion. In this instance, the five sensors 36A to 36E may be used for detecting only the holding. Such construction limits the number of sensors to be constantly turned on to only one and permits the disc insertion to be detected more rapidly.

The improvement in the operation has been described in connection with a compact disc player wherein the 8 cm disc can be inserted through any place of the disc port. However, the present invention is likewise applicable to a disc player of the type that a disc is constantly inserted through the center of the disc port. In this instance, it is merely required to provide only one sensor for detecting the disc insertion and only one sensor for detecting the disc holding along the center of the structure, resulting in significantly reducing the number of sensors to be used for this purpose.

As can be seen from the foregoing, in the present invention, a plurality of the disc detecting sensors are arranged so that the disc which is in the course of loading is detected depending upon a pattern of combination of the detection and/or non-detection modes of the sensors. The present invention, irrespective of such simple construction, exhibits excellent advantages capable of positively detecting whether the disc is actually at the insertion position or the disc loading operation is actually carried out, resulting in preventing disadvantages such as useless actuation of the drive means or the like.

While preferred embodiments of the invention have been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A disc loading structure comprising:
a transfer means for transferring a disc to a turntable; and
a sensor group comprising a plurality of disc detecting sensors each selectively exhibiting a detection mode and a non-detection mode;
said disc detecting sensors each being arranged forward of said transfer means so as to selectively generate a loading signal or an ejection signal depending upon said detection mode and non-detection mode;
said sensor group continuing to generate a loading signal while at least one of said disc detecting sensors exhibits the detection mode and generating said ejection signal while all said disc detecting sensors exhibit the non-detection mode during the generation of said loading signal.

2. A disk loading structure comprising:
a transfer means for transferring either a large disc or a small disc to a position above a turntable; and a sensor group comprising a plurality of disc detecting sensors selectively exhibiting a detection mode and a non-detection mode;

said sensor group being divided into a first sensor group section and a second sensor group section;

said first sensor group section being arranged so as to define therein an interval smaller than the diameter of a large disc;

said second sensor group arranged within said first sensor group section and arranged so as to define therein an internal smaller than the diameter of a small disc, each of the sensors providing respective signals, and control means responsive to said signals for judging whether an article inserted is an adapter for dimensionally adapting said small disc to said large disc, when said first sensor group section exhibits the detection mode and said second sensor group section exhibits the non-detection mode.

3. A disk loading structure comprising:

a plurality of disc detecting sensors, each selectively exhibiting a detection mode and a non-detection mode;

a transfer means for transferring a disc to a turntable;

a drive means for driving said transfer means; and a control means for judging an insertion of a disc into the structure and the holding of said disc by said transfer means to control actuation of said drive means;

said control means, depending upon a pattern of the combination of the detection and non-detection modes which said sensors exhibit during the disc loading operation, further detecting whether said disc has been inserted through a disc port of the structure and actuating said drive means when the insertion is detected;

said control means, depending upon a pattern of the combination of the detection and non-detection modes which said sensors exhibit within a predetermined set time period from the detection of insertion of said disc, detecting whether said disc has been inserted to a holding position at which the holding of said disc by said transfer means is carried out, and continuing the actuation of said drive means when the insertion of said disc to said holding position is detected and stops the actuation of said drive means when the holding is not detected.

4. A disc loading system for a disc player having a housing, a disc port provided on a side of the housing, means for rotating the disc, and transfer means for transferring a disc to and from the rotating means and the disc port, comprising:

disc detection means for detecting the size and position of a disc in the housing, including at least five permanently mounted sensors extending across a transfer path of the disc and positioned adjacent the disc port and the transfer means, a first sensor being positioned on one side of the transfer path and the last sensor positioned on the other side of the transfer path, rearward of the first sensor, the distance between the first and last sensors being larger than a smallest size disc operable in the disc player, the disc detection means providing an output pattern from the sensors;

means for determining, from the output pattern, if any combination of three adjacent sensors are activated, and means for activating the rotating means in response to the determining means.

5. A disc loading system as in claim 4 further including means for conserving power wherein only a sensor between the first and last sensors is initially activated with power to detect an insertion of a disc and, after detecting the disc insertion, the remaining sensors are activated.

6. A disc loading system for a disc player having a housing, a disc port provided on a side of the housing, means for rotating a disc of a predetermined size for playing, and transfer means for moving the disc between the disc port and the rotating means, comprising:

adapter means for adapting a disc of a size smaller than the predetermined size for playing on the rotating means;

disc detection means including a plurality of sensors extending across a transfer path of the disc to provide signal output patterns;

control means responsive to the signal output patterns to determine if an adapter means has been inserted into the disc port without a disc supported by the adapter means, and ejection means responsive to the determination of the control means for ejecting the adapter means.

* * * * *